(12) United States Patent
Park et al.

(10) Patent No.: US 10,440,752 B2
(45) Date of Patent: Oct. 8, 2019

(54) METHOD AND DEVICE FOR PERFORMING RANDOM ACCESS IN WIRELESS COMMUNICATION SYSTEM

(71) Applicants: Samsung Electronics Co., Ltd, Suwon-si (KR); Research & Business Foundation Sungkyunkwan University, Suwon-si (KR)

(72) Inventors: Seung-Hoon Park, Seoul (KR); Min-Gyu Lee, Seongnam-si (KR); Tae-Jin Lee, Suwon-si (KR); Jung-Min Moon, Suwon-si (KR); Jungsoo Jung, Seongnam-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/576,675
(22) PCT Filed: May 26, 2016
(86) PCT No.: PCT/KR2016/005548
  § 371 (c)(1),
  (2) Date: Nov. 22, 2017
(87) PCT Pub. No.: WO2016/190667
  PCT Pub. Date: Dec. 1, 2016

(65) Prior Publication Data
  US 2018/0139783 A1    May 17, 2018

(30) Foreign Application Priority Data
  May 26, 2015   (KR) .......................... 10-2015-0073227

(51) Int. Cl.
  *H04W 74/08*   (2009.01)
  *H04W 88/08*   (2009.01)
  *H04W 74/00*   (2009.01)

(52) U.S. Cl.
  CPC ....... *H04W 74/0833* (2013.01); *H04W 88/08* (2013.01); *H04W 74/006* (2013.01)

(58) Field of Classification Search
  CPC ..................................................... H04W 74/08
  See application file for complete search history.

(56) References Cited

U.S. PATENT DOCUMENTS

| | | | | |
|---|---|---|---|---|
| 8,175,040 B2 * | 5/2012 | Demirhan | ........... | H04W 74/008 370/328 |
| 2010/0272066 A1 | 10/2010 | Wang et al. | | |

(Continued)

FOREIGN PATENT DOCUMENTS

| | | |
|---|---|---|
| KR | 10-20120-019458 A | 3/2012 |
| KR | 10-2012-0108854 A | 10/2012 |

(Continued)

OTHER PUBLICATIONS

"3rd Generation Partnership Project; Technical Specification Group Services and System Aspects; Study on enhancements for Machine-Type Communications (MTC) (Release 12)", 3GPP TR 22.888 V12.0.0 (Mar. 2013), 22 pages.

(Continued)

*Primary Examiner* — Brandon M Renner

(57) ABSTRACT

The present disclosure relates to a $5^{th}$ Generation (5G) or pre-5G system to be provided to support a higher data transfer rate after a 4G communication system such as Long Term Evolution (LTE). The present invention is for performing random access in a wireless communication system, and a base station includes a communication unit for transmitting system information including a plurality of thresholds, and a control unit for determining a random access result for each mode on the basis of a detection result on a preamble transmitted from at least one terminal.

16 Claims, 25 Drawing Sheets

(56) References Cited

U.S. PATENT DOCUMENTS

| | | | |
|---|---|---|---|
| 2011/0201307 A1 | 8/2011 | Segura | |
| 2013/0044657 A1 | 2/2013 | Oh et al. | |
| 2014/0177607 A1 | 6/2014 | Li et al. | |
| 2015/0146665 A1* | 5/2015 | Zhang | H04W 56/0045 370/329 |
| 2016/0302233 A1* | 10/2016 | Gopala Krishnan | H04W 74/0833 |
| 2018/0027595 A1* | 1/2018 | Wang | H04L 12/413 370/329 |
| 2018/0084578 A1* | 3/2018 | Kato | H04W 4/70 |
| 2018/0139759 A1* | 5/2018 | Park | H04W 28/0215 |

FOREIGN PATENT DOCUMENTS

| | | |
|---|---|---|
| KR | 10-2013-0037382 A | 4/2013 |
| KR | 10-2013-0087308 A | 8/2013 |

OTHER PUBLICATIONS

"3rd Generation Partnership Project; Technical Specification Group Services and System Aspects; Service accessibility (Release 13)", 3GPP TS 22.011 V13.1.0 (Sep. 2014), 27 pages.

"3rd Generation Partnership Project; Technical Specification Group Services and System Aspects; Service requirements for Machine-Type Communications (MTC); Stage 1 (Release 13)", 3GPP TS 22.368 V13.0.0 (Jun. 2014), 26 pages.

3rd Generation Partnership Project; Technical Specification Group Radio Access Network; Evolved Universal Terrestrial Radio Access (E-UTRA); Physical channels and modulation (Release 12), 3GPP TS 36.211 V12.2.0 (Jun. 2014), 121 pages.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.2.1 (Jun. 2014), 57 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0 (Jun. 2014), 365 pages.

NTT Docomo, "Views on Random Access Procedure in Rel-13 Low Cost MTC", 3GPP TSG RAN WG1 Meeting #79 San Francisco, USA, Nov. 17-21, 2014, R1-144967.

Ericsson White Paper, "More Than 50 Billion Connected Devices", Feb. 2011, 12 pages.

International Search Report dated Aug. 30, 2016 in connection with International Patent Application No. PCT/KR2016/005548.

Written Opinion of the International Searching Authority dated Aug. 30, 2016 in connection with International Patent Application No. PCT/KR2016/005548.

\* cited by examiner

METHOD AND DEVICE FOR PERFORMING RANDOM ACCESS IN WIRELESS COMMUNICATION SYSTEM

CROSS-REFERENCE TO RELATED APPLICATIONS

The present application is a National Stage of International Application No. PCT/KR2016/005548 filed May 26, 2016, which claims the benefit of Korean Patent Application No. 10-2015-0073227 filed May 26, 2015, the disclosures of which are fully incorporated herein by reference into the present disclosure as if fully set forth herein.

TECHNICAL FIELD

The present invention relates to random access in a wireless communication system.

BACKGROUND

To meet a demand on wireless data traffic which has been in an increasing trend after a $4^{th}$ Generation (4G) communication system was commercialized, there is an ongoing effort to develop an improved $5^{th}$ Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in an mmWave band (e.g., such as a 60 GHz band). To reduce a propagation path loss at the mmWave band and to increase a propagation delivery distance, beamforming, massive Multiple Input Multiple Output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like are being developed in the 5G communication system.

In addition thereto, Hybrid FSK and QAM Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

In addition, since technical standards regarding various service scenarios, service requirements, and technical issues based on Long Term Evolution (LTE) wireless communication system for supporting an Internet of Things (IoT) environment are established in $3^{rd}$ Generation Partnership Project (3GPP) LTE, it is expected to have network connectivity among various terminals to perform communication without human intervention in the IOT environment. Therefore, it is expected that the number of IoT terminals to be connected to a network is explosively increased in comparison with the existing mobile communication environment, and a method of accepting random access of the plurality of terminals is required.

In addition, a technical standardization has been carried out to accept random access attempt of a great number of terminals in 3GPP. A 3GPP wireless communication system provides a non-contention based random access method and a contention based random access method. The non-contention based random access method is a method in which a base station allocates a random access resource to a specific terminal, and is limited to a case where the base station is aware of the presence of the terminal, and thus is applied only in a limited situation such as a case where the terminal performs a handover. The contention based random access method is a method in which the base station does not designate a specific terminal and terminals perform random access for an allocated random access resource through contention, and is used in general since the base station does not have to designate the specific terminal. However, there is a problem in that efficiency of random access resource utilization is decreased in proportion to the number of terminals for attempting random access due to a collision caused by a physical limitation of a random access resource and contention for the same random access resource.

SUMMARY

An exemplary embodiment of the present invention provides an apparatus and method for determining whether to transmit a preamble by utilizing a plurality of thresholds in a wireless communication system.

An exemplary embodiment of the present invention provides an apparatus and method for configuring a Medium Access Control (MAC) Protocol Data Unit (PDU) in a wireless communication system.

Another exemplary embodiment of the present invention provides an apparatus and method for configuring a reserved field in a wireless communication system.

An exemplary embodiment of the present invention provides an apparatus and method for performing scheduled transmission by receiving a random access response in a wireless communication system.

Another exemplary embodiment of the present invention provides an apparatus and method for performing random access by utilizing a plurality of thresholds in a wireless communication system.

An exemplary embodiment of the present invention provides an apparatus and method for performing random access by two types of terminals.

Another exemplary embodiment of the present invention provides an apparatus and method for performing random access by utilizing a plurality of thresholds by two types of terminals.

According to an exemplary embodiment of the present invention, a base station apparatus in a wireless communication system includes a communication unit for transmitting system information including a plurality of thresholds, and a control unit for determining a random access result for each mode on the basis of a detection result on a preamble transmitted from at least one terminal. The communication unit may transmit a message including the random access result for each mode.

According to an exemplary embodiment of the present invention, a terminal apparatus in a wireless communication system includes a communication unit for receiving system information including a plurality of thresholds, and a control unit for performing random access according to a mode determined on the basis of the plurality of thresholds. The communication unit may receive a message including a random access result for each mode.

According to an exemplary embodiment of the present invention, a method of operating a base station in a wireless communication system includes transmitting system information including a plurality of thresholds, determining a random access result for each mode on the basis of a detection result on a preamble transmitted from at least one terminal, and transmitting a message including the random access result for each mode.

According to an exemplary embodiment of the present invention, a method of operating a terminal in a wireless communication system includes receiving system information including a plurality of thresholds, performing random access according to a mode determined on the basis of the plurality of thresholds, and receiving a message including a random access result for each mode.

When random access is performed in a wireless communication system according to the present invention, the number of terminals capable of utilizing a random access resource can be increased, thereby decreasing an access delay time.

DETAILED DESCRIPTION

The present invention will be described herein below with reference to the accompanying drawings. In the following description, well-known functions or constructions are not described in detail since they would obscure the invention in unnecessary detail. In addition, since the terms used herein are defined according to the functions of the present invention, the terms may vary depending on user's or operator's intension and usage. Therefore, the terms used herein must be understood based on the descriptions made herein.

Hereinafter, a technique for random access in a wireless communication system is described. In particular, the present invention describes a technique for controlling random access by utilizing a plurality of thresholds. Specifically, hereinafter, the present invention describes various exemplary embodiments for solving a problem in that a random access control delay time is increased and a problem in that a random access resource is inefficiently used, when a plurality of terminals perform random access in a wireless communication system.

A term indicating network entities, a term indicating a message and a signal, a term indicating a resource or channel type, or the like used in the following description is for exemplary purposes only. Therefore, the present invention is not limited to terms described blow, and thus other terms having the same technical meaning may also be used.

Figure 1:
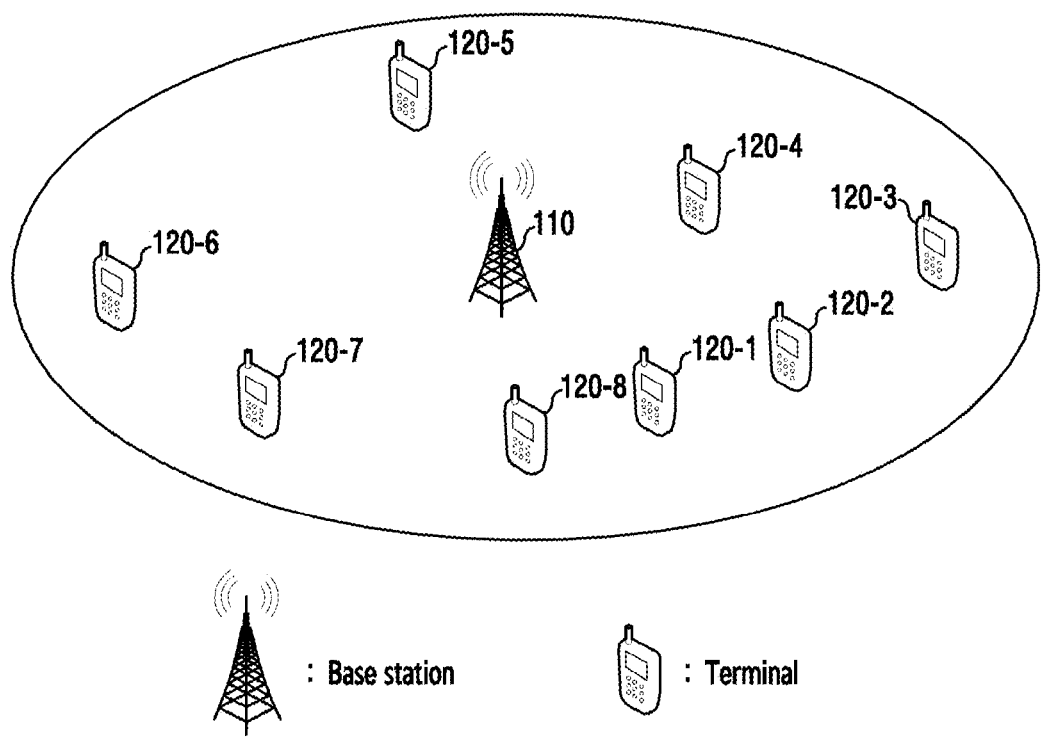
FIG. 1 illustrates a base station and terminals in a wireless communication system according to an exemplary embodiment of the present invention.

FIG. 1 illustrates a base station and terminals in a wireless communication system according to an exemplary embodiment of the present invention.

Referring to FIG. 1, a base station 110 may perform communication with a plurality of terminals 120-1, 120-2, 120-3, 120-4, 120-5, 120-6, 120-7, and 120-8. For the communication, the plurality of terminals 120-1, 120-2, 120-3, 120-4, 120-5, 120-6, 120-7, and 120-8 attempt a connection to the base station 110 through random access. The random access is a procedure of reporting that the terminal intends to have access to the base station 110. In general, the random access starts by transmitting one of signals having a predefined value. For example, the signal may be referred to as a preamble.

The random access may be classified into a contention type and a non-contention type. In case of the non-contention type random access, the base station 110 performs random access on a specific terminal without contention, and allocates a specific random access resource so that the access is successful. The allocating of the specific random access resource to the specific terminal 120-1 is possible when the base station 110 is aware of the presence of the terminal 120-1. Therefore, the non-contention type random access is applied only to a limited situation such as a case where the terminal 120-1 performs a handover. In case of the contention type random access, the terminals 120-1, 120-2, 120-3, 120-4, 120-5, 120-6, 120-7, and 120-8 attempt random access through contention for a random access resource allocated by the base station 110 without designating a specific terminal. For example, the terminal 120-1 may select one of available Physical Random Access Channels (PRACHs) and one of available preambles on the basis of random access resource information, and may transmit the selected preamble through the selected PRACH to attempt the random access.

Figure 2:
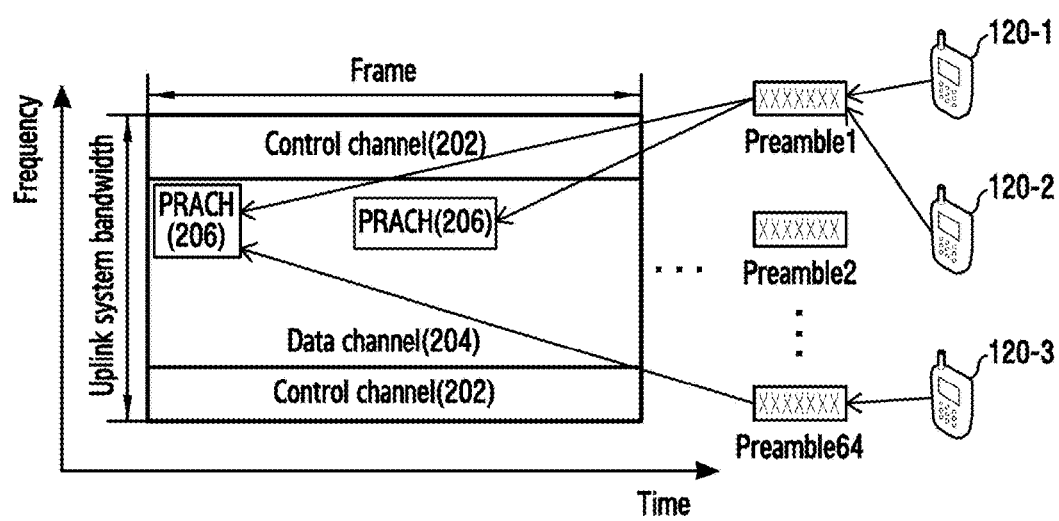
FIG. 2 illustrates one frame structure for random access in a wireless communication system according to an exemplary embodiment of the present invention.

FIG. 2 illustrates one frame structure for random access in a wireless communication system according to an exemplary embodiment of the present invention. A Frequency Division Duplexing (FDD) type uplink frame is exemplified in FIG. 2. However, one frame structure may also be similarly applied to a case of a Time Division Duplexing (TDD) type.

Referring to FIG. 2, an uplink physical channel may be divided in unit of a frame having a length of 10 ms, and the frame may include 10 subframes having a length of 10 ms. The uplink physical channel may include a control channel 202 and a data channel 204. The control channel 202 may be referred to as a Physical Uplink Control Channel (PUCCH), and the data channel 204 may be referred to as a Physical Uplink Shared Channel (PUSCH). Some resources in the data channel 204 may be allocated as a PRACH 206 for random access. A PRACH subframe is a duration including a PRACH on which the terminal transmits a random access preamble through the random access, and the number of PRACH subframes in one frame is determined by the base station. That is, the PRACH subframe implies a subframe including the PRACH 206. For example, the number of PRACHs may be 0.5, 1, 2, 3, 5, 10, or the like. Preambles are a set of orthogonal or quasi-orthogonal sequences, and may be defined, for example, based on a Zadoff-Chu sequence. The number of preambles may vary depending on a length of the preamble. For example, up to 64 preambles may be configured for each base station.

The base station 110 may transmit system information including PRACH subframe configuration information and preamble configuration information. For example, the PRACH subframe configuration information and the preamble configuration information may be transmitted through a System Information Block (SIB) 2. The terminals 120-1, 120-2, and 120-3 may acquire random access resource information by receiving the system information.

Referring to the example of FIG. 2, two PRACH subframes and 64 preambles are configured as a random access resource in one frame. In this case, the terminals 120-1, 120-2, and 120-3 select a PRACH subframe and a preamble, and transmit the preamble. Specifically, the terminal1 120-1 selects a preamble 1 from the 64 preambles, selects one subframe from the two PRACH subframes, and transmits the preamble 1 in a subframe. The terminal2 120-2 selects the preamble 1 and a different PRACH subframe, and transmits the preamble 1 in the different PRACH subframe. The terminal3 120-3 selects a preamble 64 and a first PRACH subframe. Although the terminal1 120-1 and the terminal3 120-3 select the same PRACH subframe, since different preambles are transmitted, a collision does not occur between the terminal1 120-1 and the terminal3 120-3 in the random access. In addition, although the terminal1 120-1 and the terminal2 120-2 select the same preamble, since transmission is achieved in different PRACH subframes, the collision does not occur in the random access between the terminal1 120-1 and the terminal2 120-2.

The total number of Random Access Opportunities (RAOs) that can be acquired through a random access resource may be determined by the product of the number of available PRACH subframes and the number of available preambles. The maximum number of terminals that can be accepted in one frame without a collision cannot exceed the total number of RAOs that can be provided through the random access resource. For example, in case of a Long Term Evolution (LTE) system based on FDD, since it can be configured to provide up to 640 RAOs, the maximum number of access terminals physically acceptable is 640.

In case of the example of FIG. 2, since the terminals 120-1, 120-2, and 120-3 select different preambles or select different PRACH subframes, a collision does not occur. However, if two or more terminals select the same preamble in the same PRACH subframe, the collision may occur in random access. If the number of random access resources is fixed, the collision may be increased in proportion to the number of terminals which attempt access. In addition, in this case, since efficiency of random access resource utilization deteriorates, a delay time is increased due to random access re-attempt of the terminal. Further, even if the random access resource is adoptively allocated, large-scale access in which the number of terminals for attempting random access significantly exceeds the maximum number of random access resources that can be allocated may occur, which may lead to an increase in the number of collisions. Therefore, in order to increase efficiency of random access, a procedure of FIG. 3 below may be performed.

Figure 3:
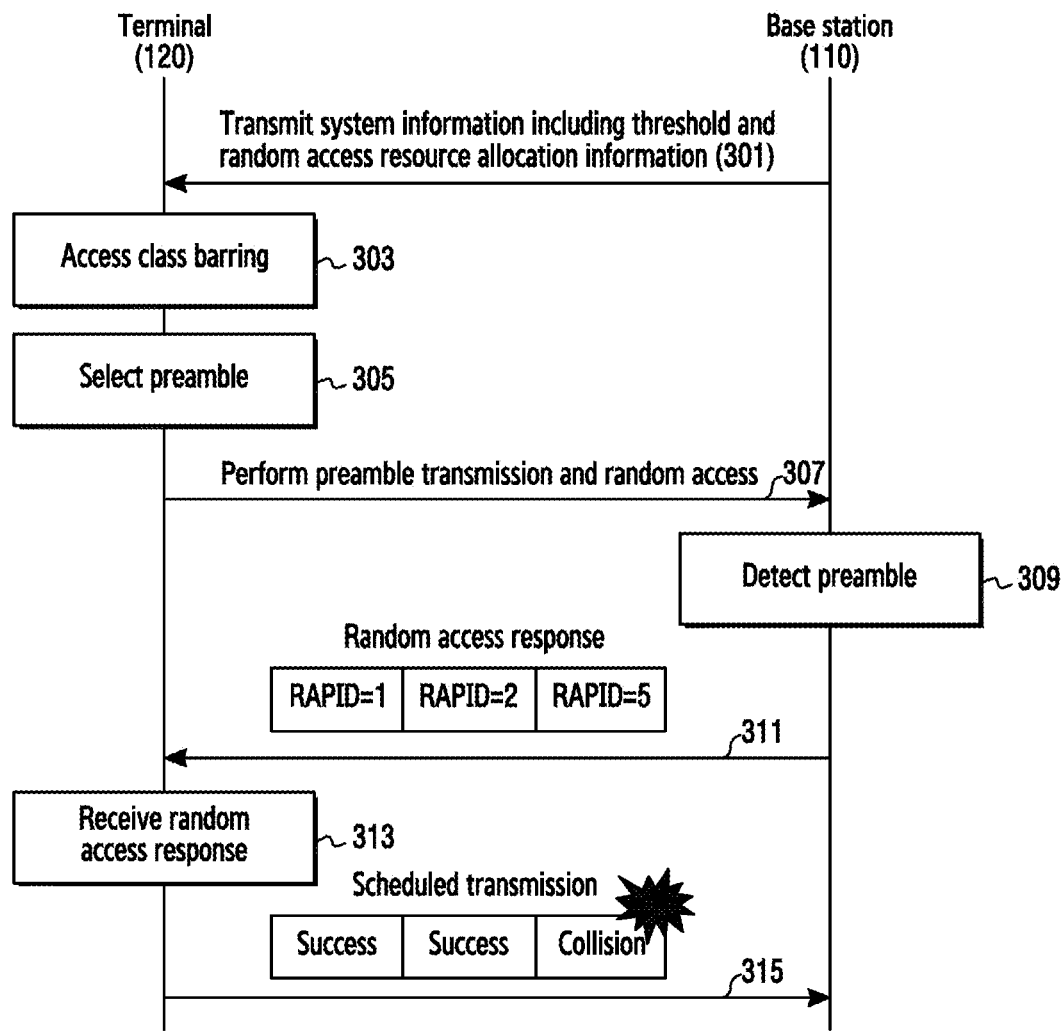
FIG. 3 illustrates a random access procedure including a process of controlling the number of terminals for attempting random access in a wireless communication system.

FIG. 3 illustrates a random access procedure including a process of controlling the number of terminals for attempting random access in a wireless communication system. The procedure of FIG. 3 may be referred to as a random access procedure including Access Class Barring (ACB).

Referring to FIG. 3, in step 301, the base station 110 transmits a parameter related to the ACB and system information including random access resource information to the terminal 120. The parameter related to the ACB includes a threshold for determining whether random access is performed. In addition, the parameter related to the ACB may further include an access barring factor, an access barring time, a bitmap for access control for each Access Class (AC), or the like.

In step 303, the terminal 120 receives the system information including a threshold, and thereafter performs an ACB procedure. The ACB procedure is an operation for controlling the number of terminals which attempt random access on the basis of the threshold. The ACB procedure aims to maintain efficiency of random access resource utilization within a specific range in such a manner that the base station 110 restricts the number of terminals which attempt the random access.

Subsequently, proceeding to step 305, the terminal 120 selects a PRACH subframe and a preamble, and proceeding to step 307, performs random access while transmitting the preamble to the base station 110. In this case, proceeding to step 309, the base station 110 detects the preamble transmitted from the terminal. In step 311, the base station 110 transmits a random access response to the terminal 120 according to a result of preamble detection. Subsequently, processing to step 313, the terminal 120 receives the random access response, and proceeding to step 315, performs scheduled transmission on the basis of received information. The scheduled transmission implies that the terminal 120 performs communication through an uplink resource allocated by the base station 110 as to the selected PRACH subframe and an identifier of the selected preamble.

Figure 4:
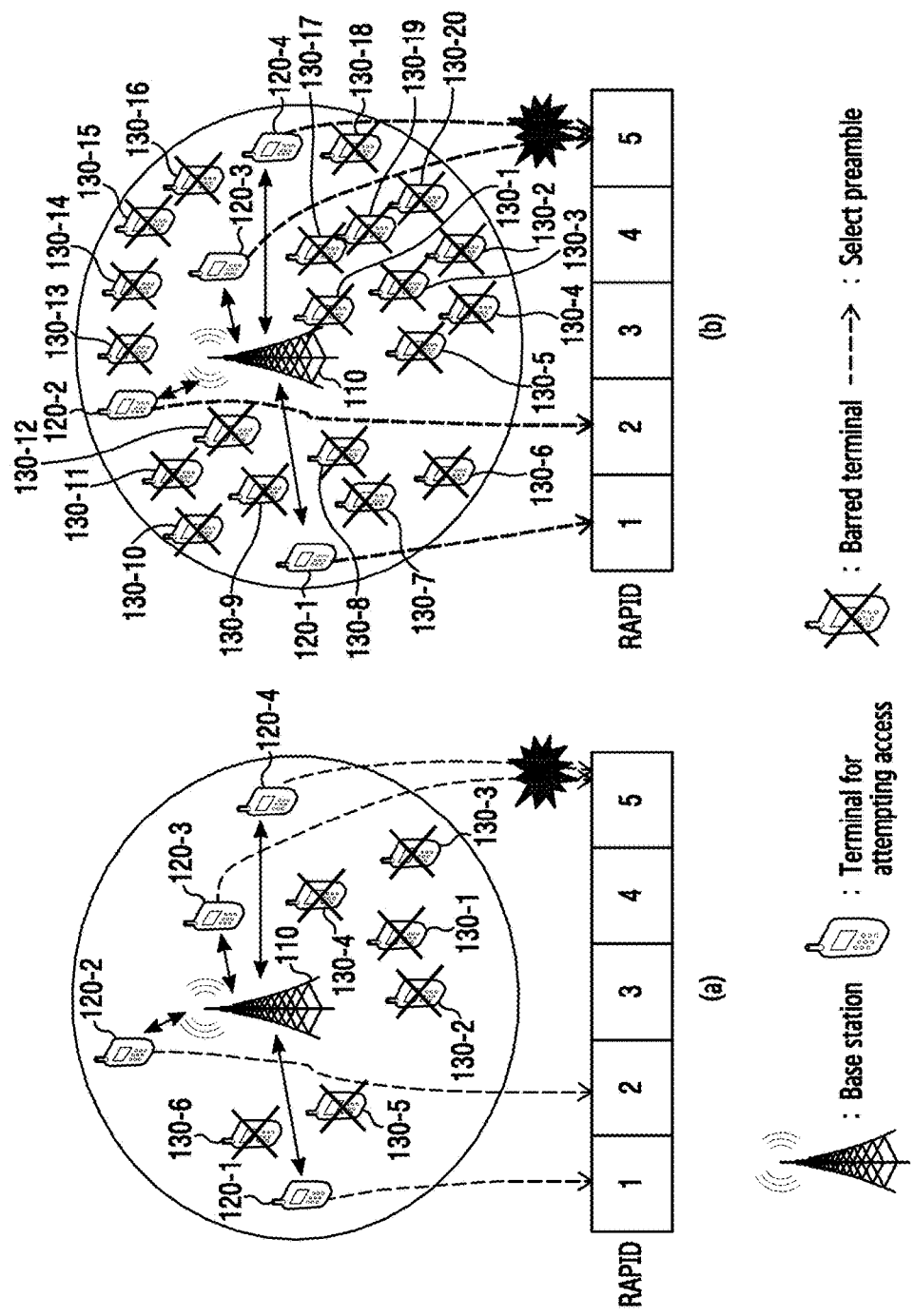
FIG. 4 illustrates a communication environment change based on the number of terminals for attempting random access in a wireless communication system.

FIG. 4 illustrates a communication environment change based on the number of terminals for attempting random access in a wireless communication system. A case of applying the procedure of FIG. 3 is exemplified in FIG. 4.

Referring to FIG. 4A, five RAOs are provided in one PRACH subframe. Random Access Preamble IDentifiers (RAPIDs) 1 to 5 respectively correspond to the five preambles. The RAPID may be referred to as a preamble identifier. According to an ACB procedure, the terminals 130-1, 130-2, 130-3, 130-4, 130-5, and 130-6 do not attempt random access. The remaining terminals 120-1, 120-2, 120-3, and 120-4 attempt random access to select preambles. Herein, the remaining terminals 120-1, 120-2, 120-3, and 120-4 are terminals for attempting access.

Specifically, the terminal 120-1 selects a preamble corresponding to a preamble identifier 1, the terminal 120-2 selects a preamble corresponding to a preamble identifier 2, and the terminal 120-3 and the terminal 120-4 simultaneously select a preamble corresponding to a preamble identifier 5. A preamble corresponding to a preamble identifier 3 and a preamble corresponding to a preamble identifier 4 are not selected. The terminals 120-1 and 120-2 which have selected the preambles respectively corresponding to the preamble identifiers 1 and 2 successfully perform a connection through random access. However, the two terminals 120-3 and 120-4 which have selected the preamble corresponding to the preamble identifier 5 collide in the random access, and thus fail in the connection. That is, since two preambles among the total five preambles are utilized in the successful access, efficiency of random access is 40%.

Referring to FIG. 4B, five RAOs are provided in one PRACH subframe. According to an ACB procedure, the terminals 130-1, 130-2, 130-3, 130-4, 130-5, 130-6, 130-7, 130-8, 130-9, 130-10, 130-11, 130-12, 130-13, 130-14, 130-15, and 130-20 do not attempt random access. The remaining terminals 120-1, 120-2, 120-3, and 120-4 attempt random access to select preambles. That is, a case where large-scale access occurs in which the number of terminals for attempting random access significantly excesses the maximum number of random access resources that can be allocated is exemplified in FIG. 4B. That is, the number of terminals which cannot attempt random access is significantly increased due to the occurrence of the large-scale access. That is, if the number of terminals for attempting random access is limited due to ACB, the number of barred terminals may be significantly increased. Accordingly, efficiency for random access resource utilization may be decreased, and a delay time is increased since it is waited for until a random access re-attempt time.

Various exemplary embodiments of the present invention propose an overlapping access barring scheme based on multiple decisions on whether barring is achieved when an access barring scheme is applied such as the aforementioned ACB. That is, according to an exemplary embodiment of the present invention, the terminal performs a primary access barring decision, and if it is determined that the access is barred in the primary access barring decision, performs a secondary access barring decision. The primary access barring decision may be referred to as Primary Access Class Barring (PACB), and the secondary access barring decision may be referred to as Secondary Access Class Barring (SACB).

In the following description, when it is determined to attempt random access in the primary access barring decision, it is referred to as a 'first mode', and when it is determined not to attempt random access in the primary access barring decision and it is determined to attempt random access in the second access barring decision, it is referred to as a 'second mode'. A terminal operating in the first mode transmits a preamble to attempt random access, and a terminal operating in the second mode does not transmit the preamble to attempt random access. That is, the terminals equally select the preamble and attempt random access, and only difference is that the preamble is transmitted or not transmitted. Accordingly, upon detecting the preamble, the base station may determine random access attempt performed by at least one terminal which has selected the preamble in the first mode. On the other hand, upon not detecting the preamble, the terminal may determine random access attempt performed by at least one terminal which has selected the preamble in the second mode. Herein, the terminal operating in the first mode may be referred to as a 'primary random access terminal', and the terminal operating in the second mode may be referred to as a 'secondary random access terminal'.

Figure 5:
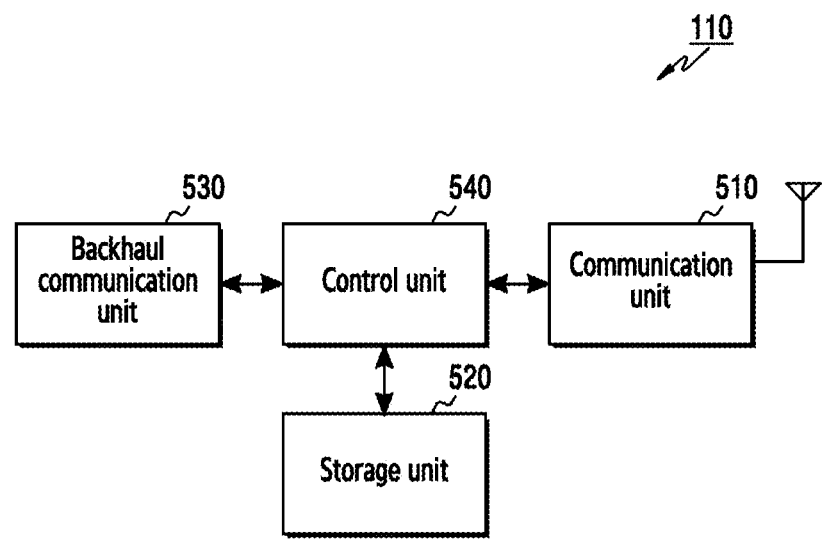
FIG. 5 is a block diagram of a base station in a wireless communication system according to an exemplary embodiment of the present invention.

FIG. 5 is a block diagram of a base station in a wireless communication system according to an exemplary embodiment of the present invention. A structure of the base station 110 is exemplified in FIG. 5. Hereinafter, the term '... unit', '... device', or the like implies a unit of processing at least one function or operation, and may be implemented in hardware or software or in combination of the hardware and the software.

Referring to FIG. 5, the base station includes a communication unit 510, a storage unit 520, a backhaul communication unit 530, and a control unit 540.

The communication unit 510 performs functions for transmitting and receiving a signal through a radio channel. For example, the communication unit 510 performs a function of conversion between a baseband signal and a bit-stream according to a physical layer standard of a system. For example, in data transmission, the communication unit 510 generates complex symbols by coding and modulating a transmission bit-stream. In addition, in data reception, the communication unit 510 restores a reception bit-stream by demodulating and decoding a baseband signal. In addition, the communication unit 510 up-converts a baseband signal into a Radio Frequency (RF) signal and thereafter transmits it through an antenna, and down-converts an RF signal received through the antenna into a baseband signal. For example, the communication unit 510 may include a transmission filter, a reception filter, an amplifier, a mixer, an oscillator, a Digital to Analog Convertor (DAC), an Analog to Digital Convertor (ADC), or the like. In addition, the communication unit 510 may include a plurality of RF chains. Further, the communication unit 510 may perform beamforming. For the beamforming, the communication unit 510 may adjust a phase and magnitude of each of signals transmitted and received through a plurality of antennas or antenna elements. The communication unit 510 transmits and receives a signal as described above. Accordingly, the communication unit 510 may be referred to as a transmitter, a receiver, or a transceiver.

The storage unit 520 stores data such as a basic program, application program, configuration information, or the like for an operation of the base station. In particular, the storage unit 520 may store a codebook for beamforming of a data signal. In addition, the storage unit 520 provides the stored data at the request of the control unit 540.

The backhaul communication unit 530 provides an interface for performing communication with different nodes in a network. That is, the backhaul communication unit 530 converts a bit-stream transmitted from the base station to a different node, e.g., a different base station, core network, and the like, into a physical signal, and converts a physical signal received from the different node into a bit-stream.

The controller 540 controls overall operations of the base station. For example, the controller 540 transmits and receives a signal via the communication unit 510. Further, the controller 540 writes/reads data to/from the storage unit 520. For this, the controller 540 may include at least one processor.

According to an exemplary embodiment of the present invention, the controller 540 may estimate the number of terminals for attempting random access, and may determine a plurality of probability values for ACB on the basis of the estimated number of terminals. Herein, the plurality of probability values may include a primary threshold for determining whether it is primary access barring and a secondary threshold for determining whether it is secondary access barring. The primary threshold may be referred to as a primary ACB probability value, and the secondary threshold may be referred to as secondary ACB probability value. In addition, the controller 540 may determine a random access result on the basis of a detection result. In addition, the controller 540 may allow a Random Access Response (RAR) to include information indicating whether each preamble is detected.

Specifically, the controller 540 may transmit system information including a plurality of thresholds such as a primary threshold, a secondary threshold, or the like, and the number of random access opportunities to the terminals via the communication unit 510. In addition, the controller 540 may receive a preamble from the terminals via the communication unit 510, and may transmit a message including a random access response for each preamble to the terminals. The random access preamble may be classified for each mode determined according to a detection result of the received preamble. For example, the controller 540 may control the base station to perform procedures illustrated in FIG. 7, FIG. 9, FIG. 11, FIG. 12, FIG. 15, FIG. 16, FIG. 21, FIG. 23, or the like described below.

Figure 6:
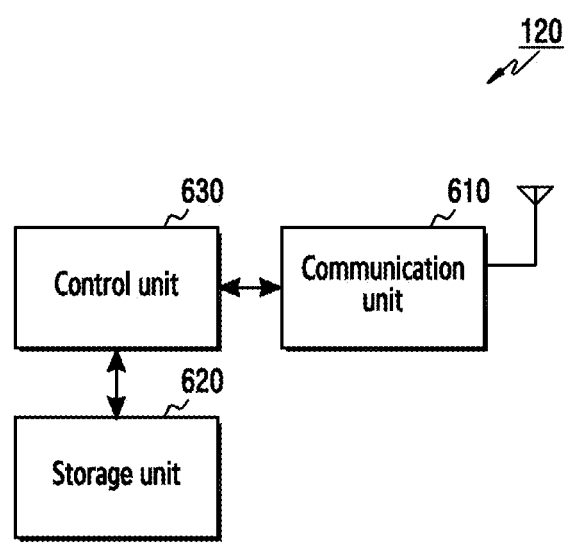
FIG. 6 is a block diagram of a terminal in a wireless communication system according to an exemplary embodiment of the present invention.

FIG. 6 is a block diagram of a terminal in a wireless communication system according to an exemplary embodiment of the present invention. A structure of the terminal 120 is exemplified in FIG. 6. Hereinafter, the term ' . . . unit', ' . . . device', or the like implies a unit of processing at least one function or operation, and may be implemented in hardware or software or in combination of the hardware and the software.

Referring to FIG. 6, the terminal includes a communication unit 610, a storage unit 620, and a control unit 630.

The communication unit 610 performs functions for transmitting and receiving a signal through a radio channel. For example, the communication unit 610 performs a function of conversion between a baseband signal and a bit-stream according to a physical layer standard of a system. For example, in data transmission, the communication unit 610 generates complex symbols by coding and modulating a transmission bit-stream. In addition, in data reception, the communication unit 610 restores a reception bit-stream by demodulating and decoding a baseband signal. In addition, the communication unit 610 up-converts a baseband signal into a Radio Frequency (RF) signal and thereafter transmits it through an antenna, and down-converts an RF signal received through the antenna into a baseband signal. For example, the communication unit 610 may include a transmission filter, a reception filter, an amplifier, a mixer, an oscillator, a Digital to Analog Convertor (DAC), an Analog to Digital Convertor (ADC), or the like. The communication unit 610 transmits and receives a signal as described above. Accordingly, the communication unit 610 may be referred to as a transmitter, a receiver, or a transceiver.

The storage unit 620 stores data such as a basic program, application program, configuration information, or the like for an operation of the terminal. In particular, the storage unit 620 may store a codebook for feedback of channel information. In addition, the storage unit 620 provides the stored data at the request of the control unit 630.

The controller 640 controls overall operations of the terminal. For example, the controller 640 transmits and receives a signal via the communication unit 610. Further, the controller 640 writes/reads data to/from the storage unit 620. For this, the controller 640 may include at least one processor. For example, the controller 630 may include a Communication Processor (CP) for controlling communication and an Application Processor (AP) controlling an upper layer such as an application program or the like.

According to an exemplary embodiment of the present invention, the controller 630 may receive system information including a plurality of thresholds such as a primary threshold, a secondary threshold, or the like, and the number of random access opportunities from the base station via the communication unit 610. In addition, the controller 630 may adoptively perform random access on the basis of the plurality of thresholds received by using the system information from the base station. For this, the controller 630 may determine a random number, and may compare the random number with the thresholds. For example, the random number may be determined as an arbitrary value in the range of 0 to 1 by using a decision algorithm according to a predefined criterion. According to a comparison result of the random number and the threshold, the controller 630 may select a preamble for random access attempt. In addition, the controller 630 transmits a preamble to the base station 110 via the communication unit 610, and receives a random access response for each preamble from the base station 110. However, according to a mode selected on the basis of the thresholds, the controller 630 may provide control not to transmit the preamble. The random access response may include a different random access result for each mode determined according to the preamble detection result in the base station. For example, the controller 630 may control the terminal to perform procedures illustrated in FIG. 8, FIG. 9, FIG. 12, FIG. 15, FIG. 17, FIG. 21, FIG. 23, or the like described below.

Figure 7:
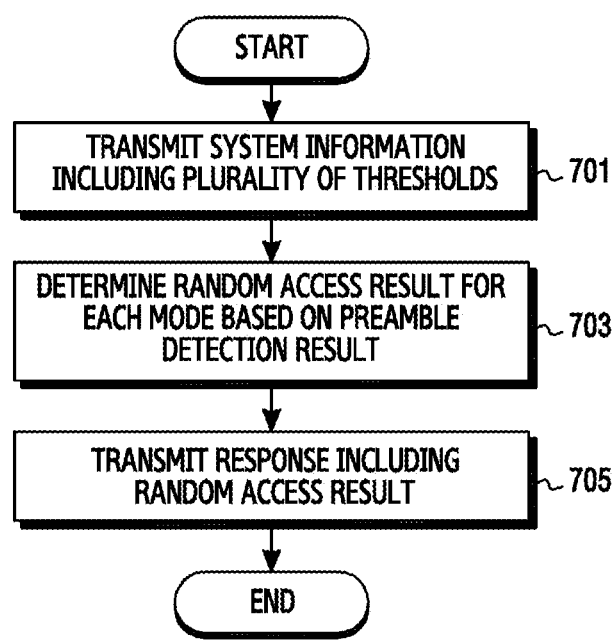
FIG. 7 illustrates a procedure of operating a base station in a wireless communication system according to an exemplary embodiment of the present invention.

FIG. 7 illustrates a procedure of operating a base station in a wireless communication system according to an exemplary embodiment of the present invention. A method of operating the base station 110 is exemplified in FIG. 7.

Referring to FIG. 7, in step 701, the base station transmits system information including a plurality of thresholds to a terminal. As primary access barring information and secondary access barring information for performing a plurality of access barring decisions, the thresholds include primary and secondary thresholds which are probability values. For example, the primary access barring information includes a primary random access probability $p_{PACB}$ determined as a value in the range of 0 to 1, and the secondary access barring information includes a secondary random access probability $p_{SACB}$ determined as a value in the range of 0 to 1. The secondary threshold may be defined to be greater than the primary threshold.

Thereafter, proceeding to step 703, the base station 110 determines a random access result for each mode on the basis of a preamble detection result. The base station 110 attempts detection of preambles from terminals, and confirms at least one detected preamble and at least one not-detected preamble. The preamble may be detected through a correlation operation. When detecting the preamble, the base station 110 may detect a preamble transmitted from a terminal of a first mode, and may detect a preamble selected by a terminal of a second mode. Therefore, according to whether the preamble is detected, the base station 110 may determine terminals corresponding to the first mode and terminals corresponding to the second mode. In other words, the base station determines whether random access is attempted by at least one terminal operating in the first mode for the detected preamble, and determines whether random access is attempt by at least one terminal operating in the second mode for the not-detected preamble. That is, the base station 110 may determine which preamble is used for random access attempt based on the first mode, and may determine which preamble is used for random access attempt based on the second mode. Therefore, the base station may provide other random access results for terminals determined for each mode.

Thereafter, proceeding to step 705, the base station 110 transmits a response including a random access result. The response is a message for allocating a resource to a terminal which has attempted random access and for allocating an identifier for the terminal. That is, the response may include at least one of resource allocation information, an identifier, and Timing Advance (TA). Further, the response includes a field indicating whether it is a response corresponding to random access attempt for the first mode or a response corresponding to random access attempt of the second mode. Hereinafter, for convenience of explanation, subsequent fields are referred to as a 'Secondary (S)-field'. That is, the base station 110 transmits a response for each preamble as a random access result. In this case, the base station 110 sets an S-field included in a response corresponding to a preamble determined by random access attempt in the first mode to a negative value (e.g., 0), and sets an S-field included in a response corresponding to a preamble determined by random access attempt in the second mode to a positive value (e.g., 1).

In the exemplary embodiment described with reference to FIG. 7, access barring decisions are achieved two times such as primary access barring, secondary access barring, or the like. However, the present invention is not limited thereto, and thus access barring decisions may be achieved three or more times according to another exemplary embodiment of the present invention.

Figure 8:
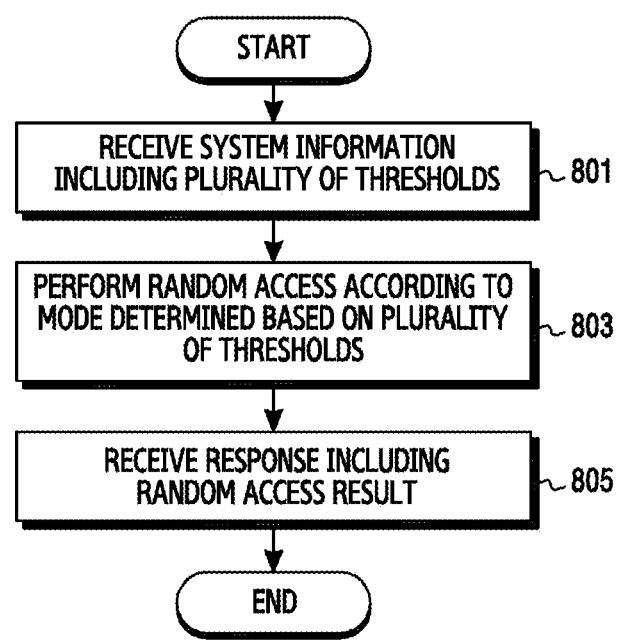
FIG. 8 illustrates a procedure of operating a terminal in a wireless communication system according to an exemplary embodiment of the present invention.

FIG. 8 illustrates a procedure of operating a terminal in a wireless communication system according to an exemplary embodiment of the present invention. A method of operating the terminal is exemplified in FIG. 8.

Referring to FIG. 8, in step 801, the terminal 120 receives system information including a plurality of thresholds from a base station. As primary access barring information and secondary access barring information determined to perform a plurality of access barring decisions, the thresholds include primary and secondary thresholds which are probability values. For example, the primary access barring information includes a primary random access probability $p_{PACB}$ determined as a value in the range of 0 to 1, and the secondary access barring information includes a secondary random access probability $p_{SACB}$ determined as a value in the range of 0 to 1. In general, the secondary threshold may be defined to be greater than the primary threshold.

Thereafter, proceeding to step 803, the terminal 120 performs random access according to a mode determined on the basis of the plurality of thresholds. The mode may be selected as one of a first mode in which random access is attempted by transmitting a preamble and a second mode in which random access is attempted by not transmitting the preamble. For this, the terminal 120 may generate a random number in the range of 0 to 1, and compares the random number with the primary threshold and the secondary threshold. For example, if the random number is less than the primary threshold, the terminal selects the first mode. On the other hand, if the random number is greater than or equal to the primary threshold, the terminal compares the random number with the secondary threshold. If the random number is less than the secondary threshold, the terminal 120 selects the second mode. If the random number is greater than or equal to the secondary threshold, the terminal 120 determines that random access is barred. In this case, step 805 described below is skipped. Upon selecting the first mode, the terminal 120 selects one of available PRACH subframes and one of available preambles on the basis of wireless random access resource allocation information acquired by using system information, and performs random access by transmitting the selected preamble through the selected PRACH subframe. Upon selecting the second mode, the terminal 120 selects one of the available PRACH subframes and one of the available preambles on the basis of the wireless random access resource allocation information acquired by using the system information, and performs random access by not transmitting the selected preamble through the selected PRACH subframe. Herein, non-transmission of the preamble may imply that the terminal 120 performs random access without transmitting the preamble in the second mode.

Thereafter, proceeding to step 805, the terminal 120 receives a response including a random access result. The response is a message for allocating a resource to a terminal which has attempted random access and for allocating an identifier for the terminal. That is, the response may include at least one of resource allocation information, an identifier, and TA. In this case, the response further includes an S-field indicating a corresponding mode to report whether random access attempt is random access attempt based on the first mode or random access attempt based on the second mode. Accordingly, the terminal may determine a target of a random access response. Specifically, upon selecting the first mode in step 803, if an S-field of a response corresponding to a preamble selected by the terminal has a negative value (e.g., 0), the terminal determines that it is random access response for the transmitted preamble. On the other hand, upon selecting the second mode in step 803, if the S-field of the response corresponding to the preamble selected by the terminal has a positive value (e.g., 1), the terminal determines that it is random access response for the not-transmitted preamble.

Figure 9:
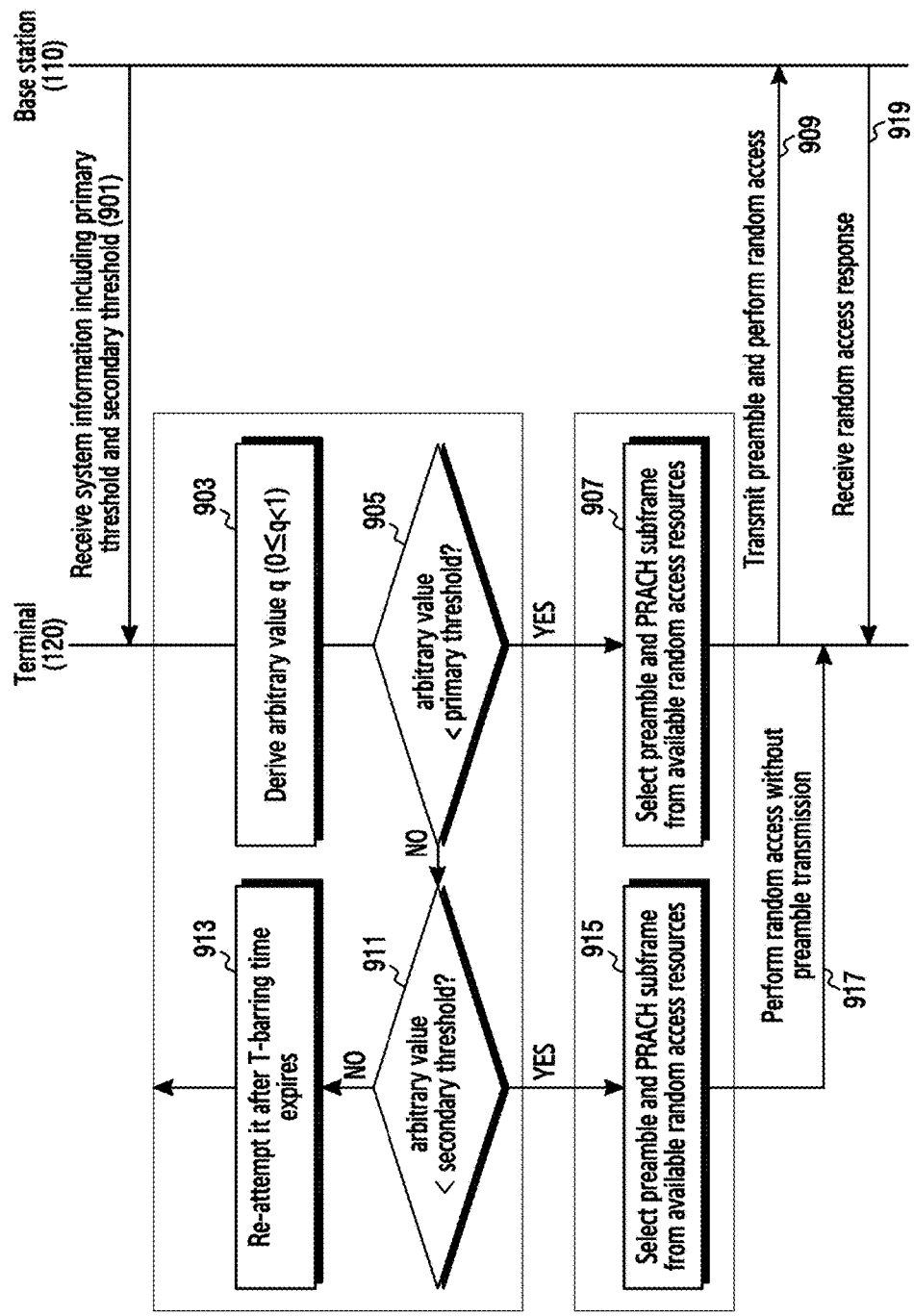
FIG. 9 illustrates a procedure of determining whether a preamble is transmitted by utilizing a plurality of thresholds in a wireless communication system according to an exemplary embodiment of the present invention.

FIG. 9 illustrates a procedure of determining whether a preamble is transmitted by utilizing a plurality of thresholds in a wireless communication system according to an exemplary embodiment of the present invention. An operation of the terminal 120 is exemplified in FIG. 9.

Referring to FIG. 9, in step 901, the terminal 120 receives system information including a primary threshold and a secondary threshold from the base station 110. The primary threshold includes information for performing primary access barring, and the secondary threshold includes information for performing secondary access barring. Hereinafter, for convenience of explanation, information for performing the primary access barring is referred to as primary access barring information, and information for performing the second access barring is referred to as secondary access barring information. The primary access barring information includes a primary random access probability $p_{PACB}$ determined as a value in the range of 0 to 1, and the secondary access barring information includes a secondary random access probability $p_{SACB}$ determined as a value in the range of 0 to 1.

Thereafter, proceeding to step 903, the terminal 120 derives a random number q. Herein, the random number may imply an arbitrary value. The random number q is a value having a uniform distribution in the range of 0 to 1. Subsequently, in step 905, the terminal 120 compares the random number q with the primary threshold acquired by receiving system information from the base station 110. Herein, if the random number q selected by the terminal 120 is less than the primary threshold, proceeding to step 907, the terminal 120 arbitrarily selects one of available PRACH subframes and selects one of any available preambles on the basis of the system information.

Subsequently, proceeding to step 909, the terminal 120 performs random access while transmitting a preamble to the base station 110. If the random number q selected by the terminal 120 is greater than or equal to the primary threshold in step 905, proceeding to step 911, the terminal 120 compares the selected random number q with the secondary threshold. Herein, if the secondary threshold is less than the random number q, proceeding to step 913, the terminal 120 waits for a T-barring time and re-attempts the random access. In the random access re-attempt procedure, the terminal may proceed to step 901 to receive the system information again. Herein, the T-barring time is a time during which the terminal waits for before proceeding to step 901. In addition, the terminal which waits for the T-barring time in step 913 may be referred to as an access barred terminal. Hereinafter, for convenience of explanation, the T-barring time may be referred to as a waiting time.

If the random number q selected by the terminal 120 is less than the secondary threshold in step 911, the terminal 120 performs step 915 to select one of any available PRACH subframes and select one of any available preambles on the basis of wireless random access resource allocation information acquired by receiving the system information.

Thereafter, proceeding to step 917, the terminal 120 performs random access by not transmitting the preamble. Herein, the performing of the random access by not transmitting the preamble indicates that the terminal 120 does not transmit the preamble in practice. Thereafter, the terminal 120 receives a random access response as a response of performing the random access from the base station 110. In case of including a result value for the random access performed by the terminal 120, the random access response is transmitted from the base station 110 on the basis of subframe information selected by the terminal 120, and is received by the terminal 120.

Figure 10:
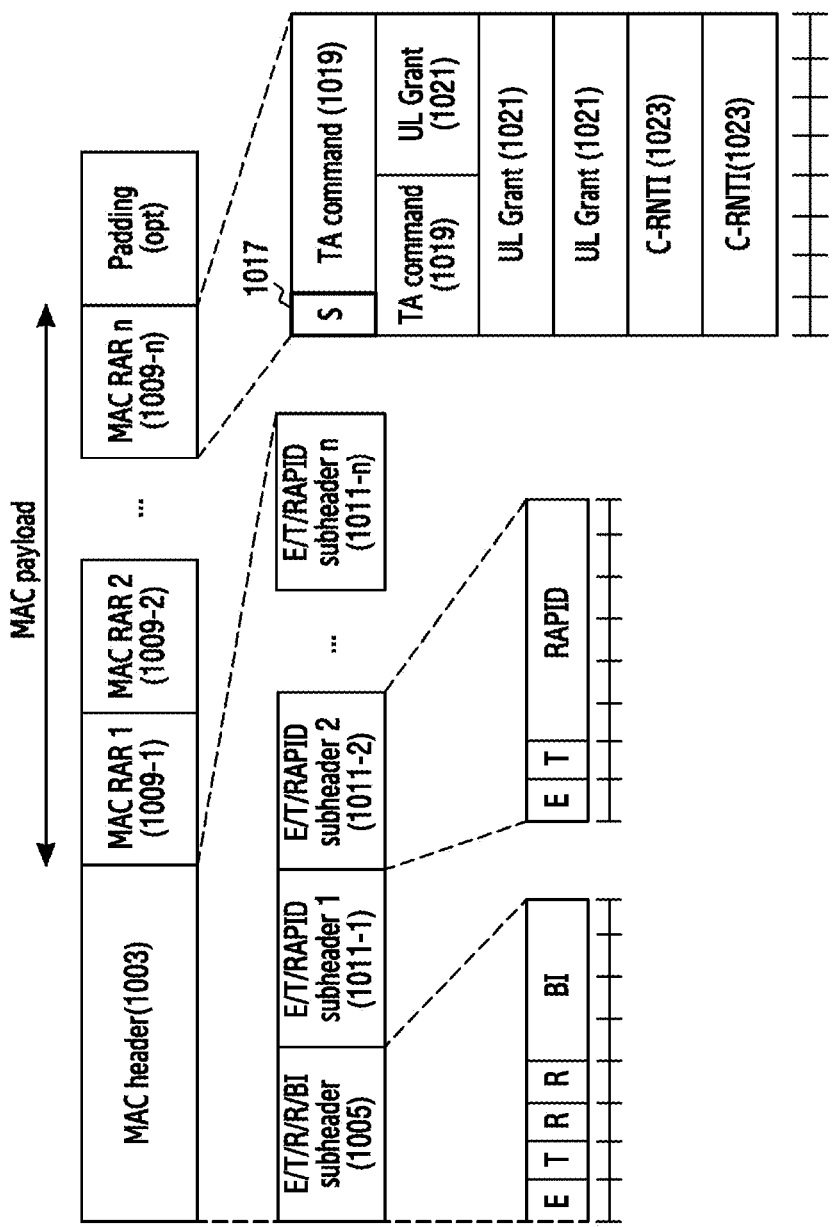
FIG. 10 illustrates an example of configuring a message including a response for random access in a wireless communication system according to an exemplary embodiment of the present invention.

FIG. 10 illustrates an example of configuring a message including a response for random access in a wireless communication system according to an exemplary embodiment of the present invention.

Referring to FIG. 10, a message includes a Medium Access Control (MAC) header 1003 and MAC Random Access Responses (RARs) 1009-1 to 1009-n which are responses corresponding to respective preambles. Occasionally, padding may be further included.

The MAC header 1003 includes a plurality of sub headers 1005 and 1011-1 to 1011-n. The sub header 1005 includes an E field, a T field, an R field, a Backoff Indicator (BI) field, and the sub headers 1101-1 to 1101-n include an E field, a T field, and an RAPID field. The E field indicates a type of information subsequent to a corresponding sub header, and the T field indicates the presence of the BI field and the RAPID field. The BI field indicates a value for determining an access reattempt time, and the RAPID field indicates a preamble identifier for a response for corresponding random access.

Each of the MAC RARs 1009-1 to 1009-n includes an S-field 1017, a Timing Advance (TA) command 1019, an uplink grant 1021, and a temporary Cell-Random Access-Random Network Temporary Identifier (C-RNTI) 1023. The S-field 1017 indicates a specific mode in which a corresponding MAC RAR is a random access response. The TA command 1019 is information for timing synchronization. The uplink grant 1021 is resource allocation information. The temporary C-RNTI 1023 is identifier information allocated to a corresponding terminal. The S field 1017 may be inserted to a position of 1 bit which is not used as a reserved bit in an RAR configuration based on the conventional technique.

According to the aforementioned message configuration, the base station may deliver a value indicating a random access result for the secondary random access terminal through the S-field 1017. The base station may allow subheaders 1011-1 to 1011-n in the MAC header to include preamble identifier information corresponding to a preamble which is successfully received or is not received. The S-field 1017 in the MAC RARs 1009-1 to 1009-n of the MAC payload corresponding to the subheaders 1011-1 to 1011-n in the MAC header may be transmitted by indicating it to 0 or 1.

Figure 11:
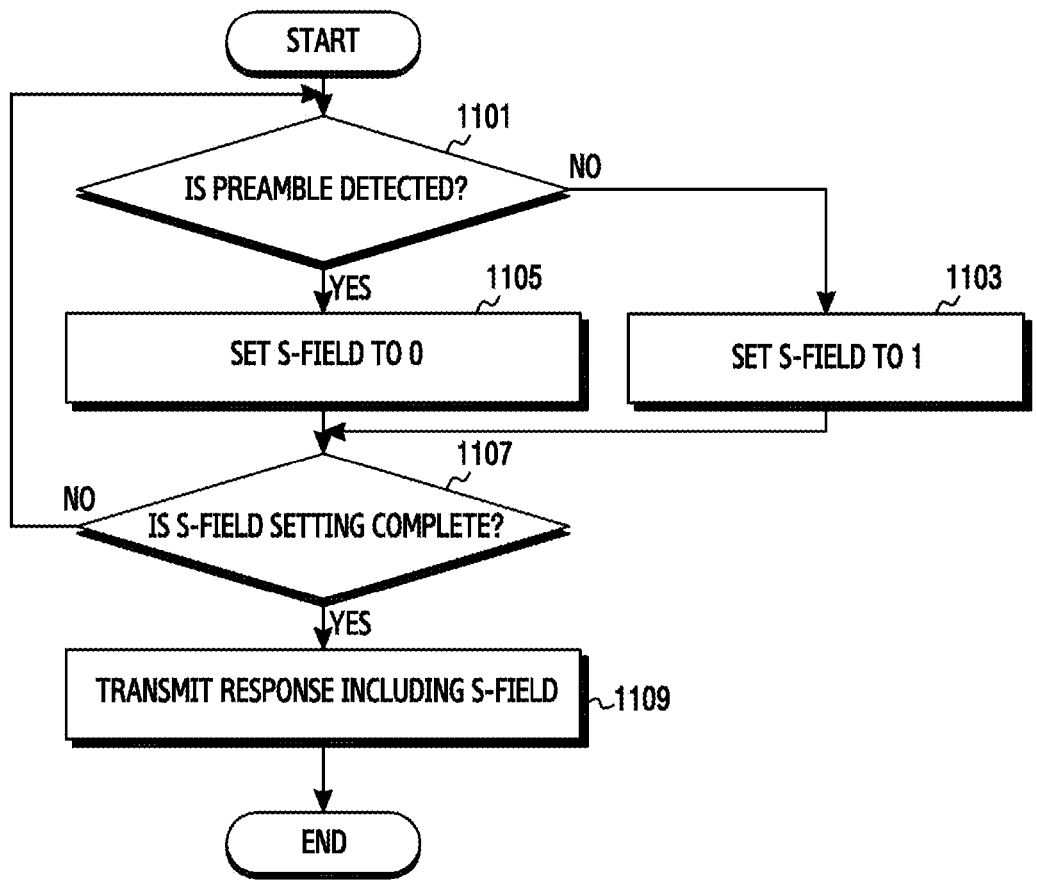
FIG. 11 illustrates a procedure of configuring an S-field in a wireless communication system according to an exemplary embodiment of the present invention.

FIG. 11 illustrates a procedure of configuring an S-field in a wireless communication system according to an exemplary embodiment of the present invention. A procedure of operating the base station 110 is exemplified in FIG. 11.

In step 1101, the base station confirms a preamble detection result. If the base station fails to detect a preamble, proceeding to step 1103, the base station sets the S-field to 1. If the base station detects the preamble, proceeding to step 1105, the base station sets the S-field to 0. The S-field is transmitted from the base station to a terminal through a random access response.

Subsequently, proceeding to step 1107, the base station confirms whether all S-fields are set. That is, since the S-field corresponds to each preamble, the base station may set the S-fields according to the number of available preambles. Therefore, the base station 110 determines whether the setting of all S-fields corresponding to a preamble identifier to be included in the response is complete, and if it is not complete, returning to step 1101, confirms a detection result of another preamble.

If the setting of all S-fields is complete, proceeding to step 1109, the base station 110 transmits random access preambles including the set S-fields. The random access response may further include resource allocation information, TA information, or the like in addition to the S-field.

Figure 12:
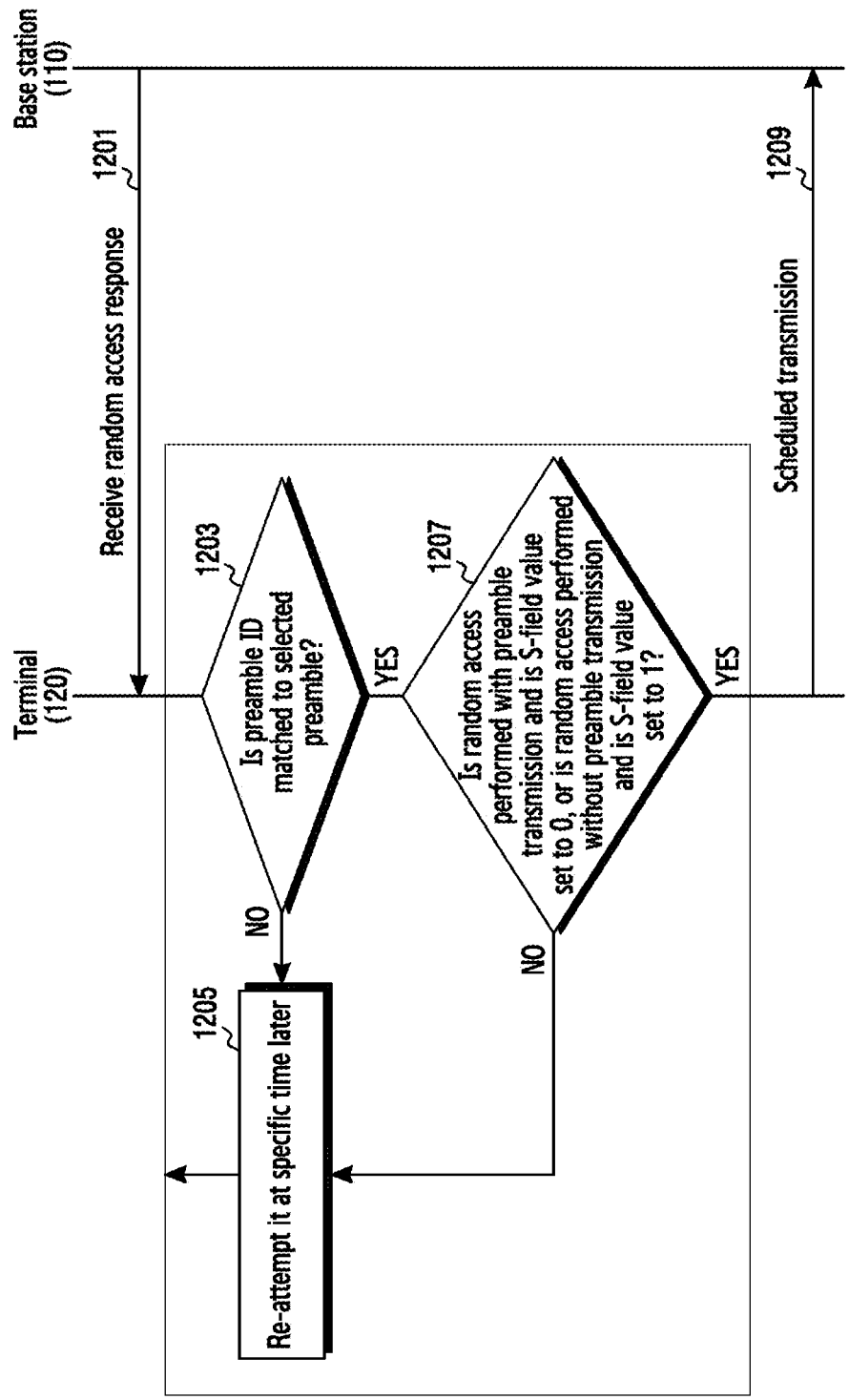
FIG. 12 illustrates a procedure of performing scheduled transmission by receiving a random access response in a wireless communication system according to an exemplary embodiment of the present invention.

FIG. 12 illustrates a procedure of performing scheduled transmission by receiving a random access response in a wireless communication system according to an exemplary embodiment of the present invention. A procedure of operating a terminal is exemplified in FIG. 12.

Referring to FIG. 12, in step 1201, the terminal 120 receives a response message including a random access result from the base station 110. Subsequently, proceeding to step 1203, the terminal 120 confirms the random access result from the received response message to determine whether a preamble identifier corresponding to a preamble selected by the terminal 120 and transmitted or not transmitted to the base station 110 and response information are present in the received response message.

If the preamble identifier corresponding to the transmitted or not transmitted preamble is not present in the response message, proceeding to step 1205, the terminal 120 re-attempts the random access at a specific time later. For example, the terminal 120 may receive the system information again from the base station 110 at the specific time later.

On the other hand, if the preamble identifier corresponding to the transmitted preamble is present in the response message, proceeding to step 1207, the terminal 120 operates differently on the basis of whether the preamble is transmitted and the S-field included in the response information. Specifically, if the terminal 120 performs random access by transmitting the preamble before the response reception and if the S-field is 0, proceeding to step 1209, the terminal 120 performs scheduled transmission. Alternatively, if the terminal 120 performs random access by not transmitting the preamble before the response reception and if the S-field is 1, proceeding to step 1209, the terminal 120 performs scheduled transmission. Otherwise, if the terminal 120 performs random access by transmitting the preamble before the response reception and if the S-field that can be confirmed from the response is 1, the terminal proceeds to step 1205. Alternatively, if the terminal 120 performs random access by not transmitting the preamble before the response reception and if the S-field that can be confirmed form the response is 0, the terminal 120 proceeds to step 1205.

Figure 13:
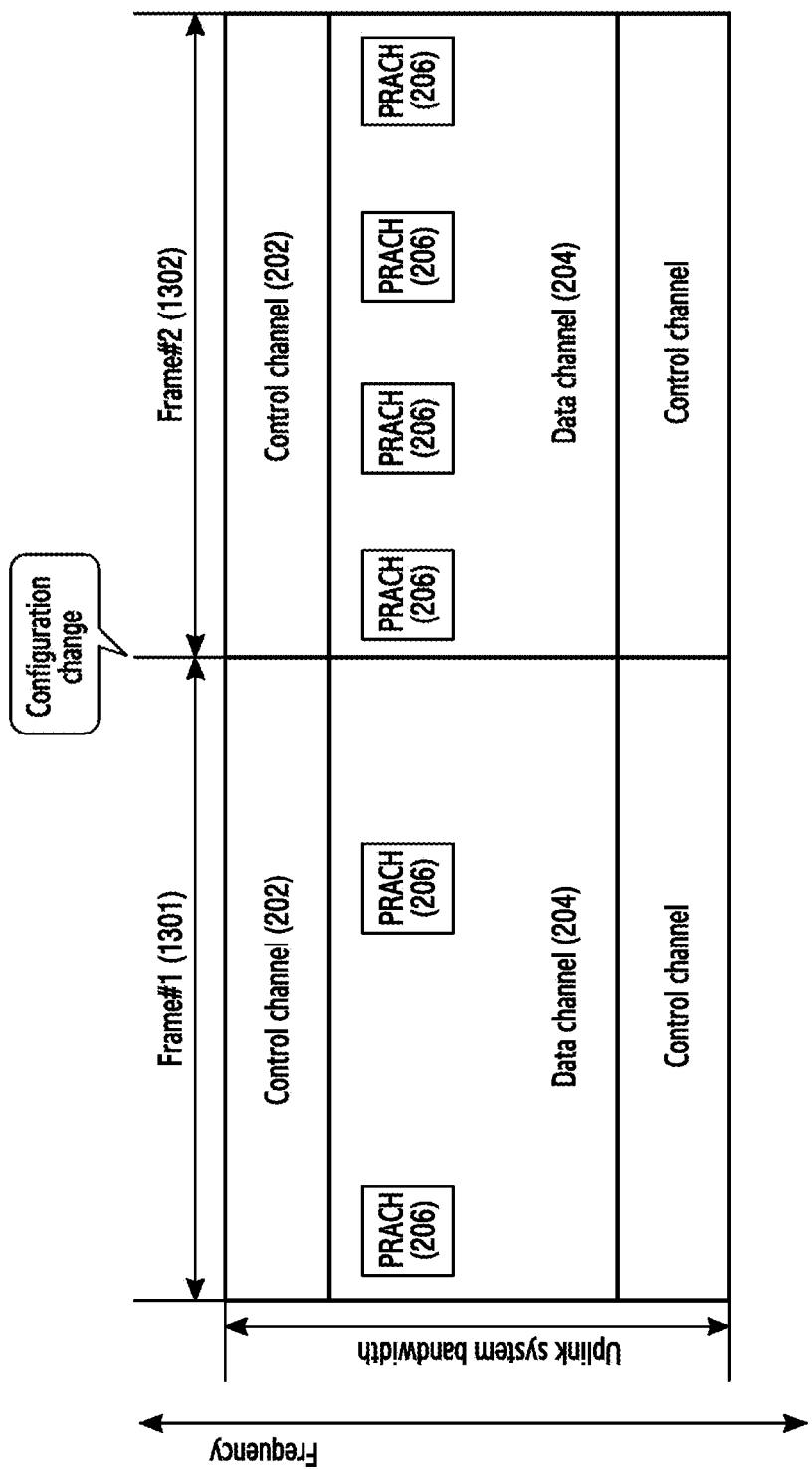
FIG. 13 illustrates an example of a change in the number of Physical Random Access Channels (PRACHs) due to a reconfiguration of a random access related parameter according to an exemplary embodiment of the present invention.

FIG. 13 illustrates an example of a change in the number of PRACHs due to a reconfiguration of a random access related parameter according to an exemplary embodiment of the present invention. A frame structure changed by maximizing efficiency of wireless access resource utilization in a base station is exemplified in FIG. 13.

Referring to FIG. 13, uplink frames 1301 and 1302 may include a control channel 202 and a data channel 204, and some resources in the data channel 204 may be allocated as a PRACH 206 for random access. A frame#1 1301 includes two PRACHs 206, and a frame#2 1302 includes four PRACHs 206.

When random access is controlled through an access barring procedure according to various exemplary embodiments of the present invention, the base station may change random access related parameters. Specifically, the base station may estimate the number of terminals for attempting random access in the frame#1 1301 at an ending time of the frame#1 1301. In addition, the base station may determine wireless random access resource allocation information and information for controlling the number of random access terminals in next system information. That is, the base station may estimate the total number of random access contention terminals and determine a primary random access probability, a secondary random access probability, and a wireless random access resource allocation amount from the subsequent frame#2 1302 on the basis of the estimated number of terminals, thereby maximizing the efficiency of the wireless random access resource. Accordingly, as shown in the example of FIG. 13, the number of PRACHs 206 may be increased from 2 to 4. On the contrary, unlike in the example of FIG. 13, the number of PRACHs 206 may be decreased. The random access related parameters (e.g., the number of PRACHs, the primary random access probability, the secondary random access probability, etc.) may be periodically optimized to increase the efficiency of the wireless random access resource. For example, the base station may determine and update optimality of parameters for every superframe or frame. Maximization of the efficiency of the wireless random access resource may be determined by Equation (1) below.

$$R_{\mathit{eff}}(L, C_{PTP}, C_{STP}) = \qquad (1)$$
$$C_{PTP}\left(\frac{1}{L}\right)\left(1-\frac{1}{L}\right)^{C_{PTP}-1} + \left(1-\frac{1}{L}\right)^{C_{PTP}} C_{STP}\left(\frac{1}{L}\right)\left(1-\frac{1}{L}\right)^{C_{STP}-1}$$

In Equation (1), $R_{\mathit{eff}}(\ )$ denotes random access efficiency, and corresponds to efficiency of wireless random access resource utilization. $R_{\mathit{eff}}$ may be expressed by a function of L, $C_{PTP}$, and $C_{STP}$. L denotes the number of random access opportunities acquired by the product of the number of PRACH subframes and the number of preambles, that is, denotes an allocation amount of the wireless random access resource. $C_{PTP}$ denotes the number of primary random access terminals. $C_{STP}$ denotes the number of secondary random access terminals. In addition, $C_{PTP}$ may be expressed by the product of a primary random access barring probability and the total number of terminals for attempting random access, and may be expressed by Equation (2).

$$C_{PTP} = p_{PACB} \cdot N \qquad (2)$$

In Equation (2), $C_{PTP}$ denotes the number of primary random access terminals, $p_{PACB}$ denotes a primary ACB probability, and N denotes the total number of terminals for attempting random access.

$C_{STP}$ may be expressed by Equation (3) below, as the product of a secondary random access barring probability and the total number of terminals for attempting random access $$C_{STP} = (p_{SACB} - p_{PACB}) \cdot N \qquad (3)$$

In Equation (3), $C_{STP}$ denotes the number of secondary random access terminals, $p_{PACB}$ denotes a primary ACB probability, $p_{SACB}$ denotes a secondary ACB probability, and L denotes an allocation amount of a wireless random access resource. Equation (3) is applied when $p_{SACB}$ is greater than or equal to $p_{PACB}$. If $p_{SACB}$ is less than $p_{PACB}$, $C_{STP}$ is 0.

An optimization problem may be expressed by Equation (4) according to Equation (1), Equation (2), and Equation (3).

$$\max_{L, C_{PTP}, C_{STP}} R_{eff}(L, C_{PTP}, C_{STP}) = \qquad (4)$$

$$C_{PTP}\left(\frac{1}{L}\right)\left(1 - \frac{1}{L}\right)^{C_{PTP}-1} + C_{STP}\left(\frac{1}{L}\right)\left(1 - \frac{1}{L}\right)^{C_{PTP}+C_{STP}-1}$$

subject to $L \in L_{set}$

In Equation (4), $R_{eff}(\ )$ denotes random access efficiency, and corresponds to efficiency of wireless random access resource utilization. $R_{eff}$ may be expressed by a function of $L$, $C_{PTP}$, and $C_{STP}$. $L$ denotes the number of random access opportunities acquired by the product of the number of PRACH subframes and the number of preambles, that is, denotes an allocation amount of the wireless random access resource. $C_{PTP}$ denotes the number of primary random access terminals. $C_{STP}$ denotes the number of secondary random access terminals. $C_{PTP}$ may be expressed by the product of a primary random access barring probability and the total number of terminals for attempting random access. $L_{set}$ denotes a set of the total number of random access opportunities that can be allocated in a system.

In addition, an optimization algorithm of random access information may be expressed by Table 1 below.

TABLE 1

Algorithm 1: proposed optimum random access resource allocation algorithm

1. : //$L_i$: number of allocated RAOs in the i th frame
2. : // $\tilde{L}_{idle,i}$: number of measured idle RAOs in the i th frame
3. : //$P_{PACB,i}$: PACB probability in the i th frame
4. : //$P_{SACB,i}$: SACB probability in the i th frame
5. : //$L_{max}$: initial number of RAOs in a frame
6. : //$L_{max}$: maximum number of RAOs in a frame
7. : //$C_{max}$: maximum number of contending devices in a frame
8. : $L_1 = L_{init}$
9. : $P_{PACB,i} = 1$
10. : $P_{SACB,i} = 1$
11. : i = 1
12. : Compute $C_{max}$
13. : for I th frame do
14. :     //Estimation phase
15. :     //Estimation the total number of random access devices
16. :     Measure (count) $\tilde{L}_{idle,i}$
17. :     Compute $\tilde{P}_{idle,i}$
18. :     Estimate $\hat{C}_{PTP,i}$
19. :     Estimate $\hat{N}_{i+1}$
20. :     // Random access resource allocation phase
21. :     // Decide the optimal PACB probability, SACB probability And the optimal number of RAOs for the next frame
22. : if $\hat{N}_{i+1} < C_{max}$ then
23. :         Compute $L_{i+1}$, $P_{PACB,i+1}$, and $P_{SACB,i+1}$
24. :     else
25. :         Compute $L_{i+1}$, $P_{PACB,i+1}$, and $P_{SACB,i+1}$
26. :     end if
27. : i = i+1
28. : end for In Table 1, the line 1 to the line 7 define $p_{PACB,i}$, $p_{SACB,i}$, $L_i$, $\tilde{L}_{idle,i}$, $L_{init}$, $L_{max}$, and $C_{max}$. $p_{PACB,i}$ denotes a primary random access probability in an $i^{th}$ frame. $p_{SACB,i}$ denotes a secondary random access probability in the $i^{th}$ frame. $L_i$ denotes the number of random access opportunities in the $i^{th}$ frame. $\tilde{L}_{idle,i}$ denotes the number of random access opportunities in which a preamble measured in the $i^{th}$ frame is not received. $L_{init}$ denotes an initial value of the number of random access opportunities that can be allocated in the base station. $L_{max}$ denotes a maximum value of the number of random access opportunities that can be allocated in the base station. $C_{max}$ denotes the total number of terminals which attempt random access that can be accepted to the maximum extent possible when $L_{max}$ is allocated.

The line 8 to the line 11 show a step of setting the primary random access probability, the secondary random access probability, and the number of random access opportunities when i is 1. $p_{PACB,1}$ is set to 1, and $p_{SACB,1}$ is also set to 1. In $L_i$ and $\tilde{L}_{idle,i}$, i is set to 1, and $L_1$ is set to $L_{init}$.

In the line 12, a value for $C_{max}$ is calculated. When $L=L_{max}$ through Equation (4), $C_{max}$ may be expressed by the sum of $C^*_{PTP}$ denoting the number of primary access terminals for maximizing Equation (4) and $C^*_{STP}$ denoting the number of secondary random access terminals. $C^*_{PTP}$ and $C^*_{STP}$ may be expressed as shown in Equation (5) below.

$$(C^*_{PTP}, C^*_{STP}) = \underset{(C_{PTP}, C_{STP})}{\arg\max}\ R_{eff}(L_{max}, C_{PTP}, C_{STP}) \qquad (5)$$

In Equation (5), $C^*_{PTP}$ denotes the maximum number of primary random access terminals when a maximum wireless random access resource allocation amount is $L_{max}$. $C^*_{STP}$ denotes the maximum number of secondary random access terminals when the maximum wireless random access resource allocation amount is $L_{max}$. $R_{eff}(\ )$ denotes efficiency of wireless random access resource utilization as a random access efficiency. $C_{PTP}$ denotes the number of primary random access terminals. $C_{STP}$ denotes the number of secondary random access terminals. $L_{max}$ denotes a maximum wireless random access resource allocation amount. In case of $L_{max}$, $C_{max}$ which is the total number of terminals for attempting random access that can be accepted by the base station to the maximum extent possible may be expressed by Equation (6) below.

$$C_{max} = C^*_{PTP} + C^*_{STP} \qquad (6)$$

In Equation (6), $C_{max}$ denotes the total number of terminals for attempting random access that can be accepted by the base station to the maximum extent possible. $C^*_{PTP}$ denotes the maximum number of primary random access terminals. $C^*_{STP}$ denotes the maximum number of secondary random access terminals.

In Table 1, the line 13 to the line 28 show a repetitive calculation process along with an increase in i. The line 14 to the line 19 show a step of estimating the number of primary random access terminals for estimating the number of terminals for attempting random access through preamble transmission in a current frame and a step of estimating the total number of terminals for attempting random access in a next frame through the estimated number of primary random access terminals and a primary random access probability used in the current frame.

From the line 16 to the line 18, the number of primary random access terminals for estimating the number of terminals for attempting random access is estimated through preamble transmission in the current frame. The base station may estimate the number of primary random access terminals at an ending time of a frame i. The base station may estimate $\tilde{L}_{idle,i}$ as indicated in the line 16 at the ending time of the frame i. In the line 17, a probability $\tilde{p}_{idle,i}$ that there is no preamble transmission in one random access opportunity is calculated on the basis of the value $\tilde{L}_{idle,i}$, calculated by Equation (7) below.

$$\tilde{p}_{idle,i} = \frac{\tilde{L}_{idle,i}1}{L_i} \qquad (7)$$

In Equation (7), $\tilde{p}_{idle,i}$ denotes a probability that there is no preamble transmission in the frame I. $\tilde{L}_{idle,i}$ denotes the number of random access opportunities in which a preamble measured in the frame i is not received. $L_i$ denotes the number of random access opportunities in the frame i.

The probability that there is no preamble transmission in one random access opportunities may be calculated by Equation (8) below.

$$p_{idle,i} = \left(1 - \frac{1}{L_i}\right)^{C_{PTP,i}} \qquad (8)$$

In Equation (8), $P_{idle,i}$ denotes a probability that there is no preamble transmission in one random access opportunities. $L_i$ denotes the number of random access opportunities in the frame I. $C_{PTP,i}$ denotes the number of primary random access terminals in the frame i.

In the line 18, $\hat{C}_{PTP,i}$ may be estimated through Equation (9) on the basis of the value $p_{idle,i}$.

$$\hat{C}_{PTP,i} = \frac{\log(\tilde{p}_{idle,i})}{\log((L_i - 1)/L_i)} \qquad (9)$$

In Equation (9), $\hat{C}_{PTP,i}$ denotes an estimation value for the number of primary random access terminals.

In the line 19, $N_i$ may be calculated through Equation (1) on the basis of $\hat{C}_{PTP,i}$ and $\tilde{p}_{idle,i}$, and $\hat{N}_{i+1}$ may be calculated by substituting $\hat{N}_i$ to $\hat{N}_{i+1}$. $\hat{N}_{i+1}$ denotes an estimation value for the total number of terminals for attempting random access in the frame i+1.

$$\hat{N}_i = \frac{\hat{C}_{PTP,i}}{p_{PACB,i}} \qquad (10)$$

In Equation (10), $\hat{N}_i$ denotes an estimation value for the total number of terminals for attempting random access in a frame i. $\hat{C}_{PTP,i}$ denotes an estimation value for the number of primary random access terminals. $p_{PACB,i}$ denotes a primary random access probability in the frame i.

The line 20 to the line 26 show a step of determining a primary random access probability, a secondary random access probability, and the number of random access opportunities through $\hat{N}_{i+1}$.

In the line 22, by distinguishing a case of $\hat{N}_{i+1}<C_{max}$ and the opposite case, if $\hat{N}_{i+1}<C_{max}$, the operation of the line 23 is performed, and otherwise, an operation of the line 25 is performed.

In the line 23, an operation is performed for a case of $\hat{N}_{i+1}<C_{max}$. In case of $\hat{N}_{i+1}<C_{max}$, Equation (4) is used to determine $L_{i+1}$ and $C_{PTP,i+1}$ through Equation (11) for $\hat{N}_{i+1}$.

$$(L_{i+1}, C_{PTP,i+1}) = \underset{(L, C_{PTP})}{\mathrm{argmax}} R_{e\!f\!f}\left(L, C_{PTP}, \hat{N}_{i+1} - C_{PTP}\right) \qquad (11)$$

In Equation (11), $L_{i+1}$ denotes the number of random access opportunities in a frame i+1. $C_{PTP,i+1}$ denotes the number of primary random access terminals in the frame i+1. $R_{eff}()$ denotes random access efficiency. L denotes the number of random access opportunities acquired by the product of the number of PRACH subframes and the number of preambles. $C_{PTP}$ denotes the number of primary random access terminals. $\hat{N}_{i+1}$ denotes an estimation value for the total number of terminals for attempting random access in the frame i+1.

In addition, $p_{PACB,i+1}$ may be determined by using Equation (12) below.

$$p_{PACB,i+1} = \frac{C_{PTP,i+1}}{\hat{N}_{i+1}} \qquad (12)$$

In Equation (12), $p_{PACB,i+1}$ denotes a primary ACB probability in a frame i+1. $C_{PTP,i+1}$ denotes the number of primary random access terminals in the frame i+1. $\hat{N}_{i+1}$ denotes an estimation value for the total number of terminals for attempting random access in the frame i+1.

$p_{SACB,i+1}$ may be determined by using Equation (13) below.

$$p_{SACB,i+1} = \frac{C_{PTP,i+1} + (\hat{N}_{i+1} - C_{PTP,i+1})}{\hat{N}_{i+1}} = 1 \qquad (13)$$

In Equation 13, $p_{SACB,i+1}$ denotes a secondary ACB probability in a frame i+1. $C_{PTP,i+1}$ denotes the number of primary random access terminals in the frame i+1. $\hat{N}_{i+1}$ denotes an estimation value for the total number of terminals for attempting random access in the frame i+1.

In the line 25, an operation is performed for a case of $\hat{N}_{i+1} \geq C_{max}$. In case of $\hat{N}_{i+1} \geq C_{max}$, since random access of a terminal can be accepted to the maximum extent possible when a random access opportunity is allocated by $L_{max}$, $L_{i+1}$ is determined as $L_{max}$, and random access is preferably limited when its amount exceeds $C_{max}$. Therefore, the base station may determine $p_{PACB,i+1}$ through Equation (14).

$$p_{PACB,i+1} = \frac{C^*_{PTP}}{\hat{N}_{i+1}} \qquad (14)$$

In Equation (14), $p_{PACB,i+1}$ denotes a primary ACB probability in a frame i+1. $C^*_{PTP}$ denotes the maximum number of primary random access terminals. $\hat{N}_{i+1}$ denotes an estimation value for the total number of terminals for attempting random access in the frame i+1.

The base station may determine $p_{SACB,i+1}$ by using Equation (15) below.

$$p_{SACB,i+1} = \frac{C^*_{PTP} + C^*_{STP}}{\hat{N}_{i+1}} = \frac{C_{max}}{\hat{N}_{i+1}} \qquad (15)$$

In Equation (15), $p_{SACB,i+1}$ denotes a secondary ACB probability in a frame i+1. $C^*_{PTP}$ denotes the maximum number of primary random access terminals. $C^*_{STP}$ denotes the maximum number of secondary random access terminals. $\hat{N}_{i+1}$ denotes an estimation value for the total number of terminals for attempting random access in the frame i+1. $C_{max}$ denotes the maximum number of available random access attempting terminals.

Figure 14:
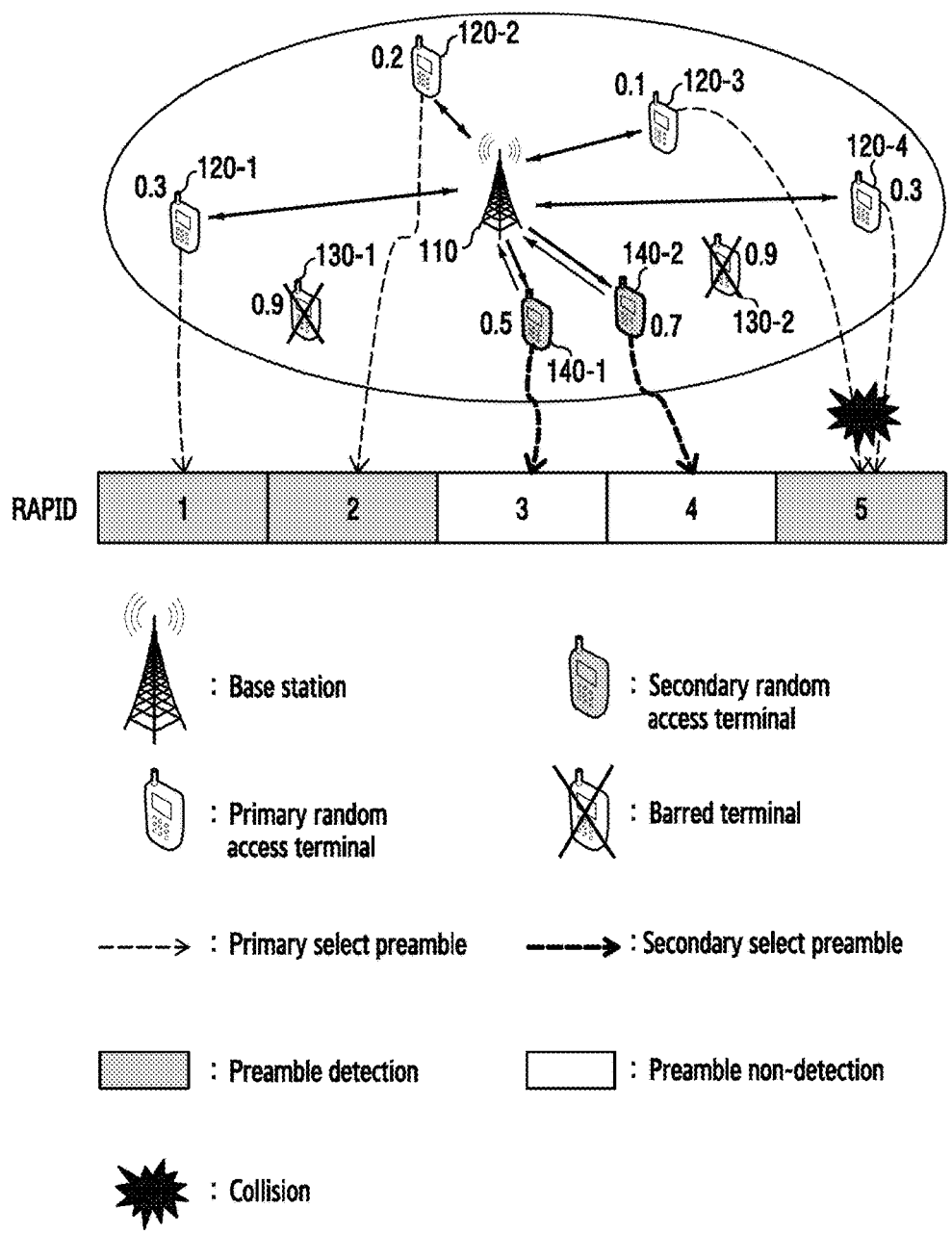
FIG. 14 illustrates a configuration of random access for utilizing a plurality of thresholds in a wireless communication system according to an exemplary embodiment of the present invention.

FIG. 14 illustrates a configuration of random access for utilizing a plurality of thresholds in a wireless communication system according to an exemplary embodiment of the present invention. Structures of the base station 110, the primary random access terminals 120-1, 120-2, 120-3, and 120-4, the secondary random access terminals 140-1 and 140-2, and barred terminals 130-1 and 130-2 of the present invention are exemplified in FIG. 14. In addition, in a network exemplified in FIG. 14, the total number of terminals 120-1, 120-2, 120-3, 120-4, 130-1, 130-2, 140-1, and 140-2 for performing random access for the base station 110 is 8, a primary ACB probability $p_{PACB}$ is 0.4, and a secondary ACB probability $p_{SACB}$ is 0.8.

Referring to FIG. 14, the primary random access terminals 120-1, 120-2, 120-3, and 120-4 select 0.3, 0.2, 0.1, and 0.3 as respective arbitrary values q. The secondary random access terminals 140-1 and 140-2 select respectively 0.5 and 0.7 as the arbitrary values q. The barred terminals 130-1 and 130-2 select 0.9 as the arbitrary value q. The primary random access terminals 120-1, 120-2, 120-3, and 120-4 which select an arbitrary value lower than the primary ACB probability select a first mode. The secondary random access terminals 140-1 and 140-2 which select an arbitrary value q higher than the primary ACB probability and lower than the secondary ACB probability select a second mode. The terminals 130-1 and 130-2 which select an arbitrary value q higher than the secondary ACB probability are random access barred terminals 130-1 and 130-2. In addition, the terminals determined to the first mode are the primary random access terminals 120-1, 120-2, 120-3, and 120-4, and the terminals determined to the second mode are secondary random access terminals 140-1 and 140-2.

The primary random access terminal 120-1 selects a preamble corresponding to a preamble identifier 1 and transmits the preamble to the base station 110. The primary random access terminal 120-2 selects a preamble corresponding to a preamble identifier 2 and transmits the preamble to the base station 110. The primary random access terminal 120-3 and the primary random access terminal 120-4 select a preamble corresponding to a preamble identifier 5, which leads to a collision.

The secondary random access terminal 140-1 selects a preamble corresponding to a preamble identifier 3 and transmits the preamble to the base station 110. The secondary random access terminal 140-2 selects a preamble corresponding to a preamble identifier 4 and does not transmit the preamble to the base station 110.

The barred terminals 130-1 and 130-2 do not select a preamble, and wait for a waiting time.

Figure 15:
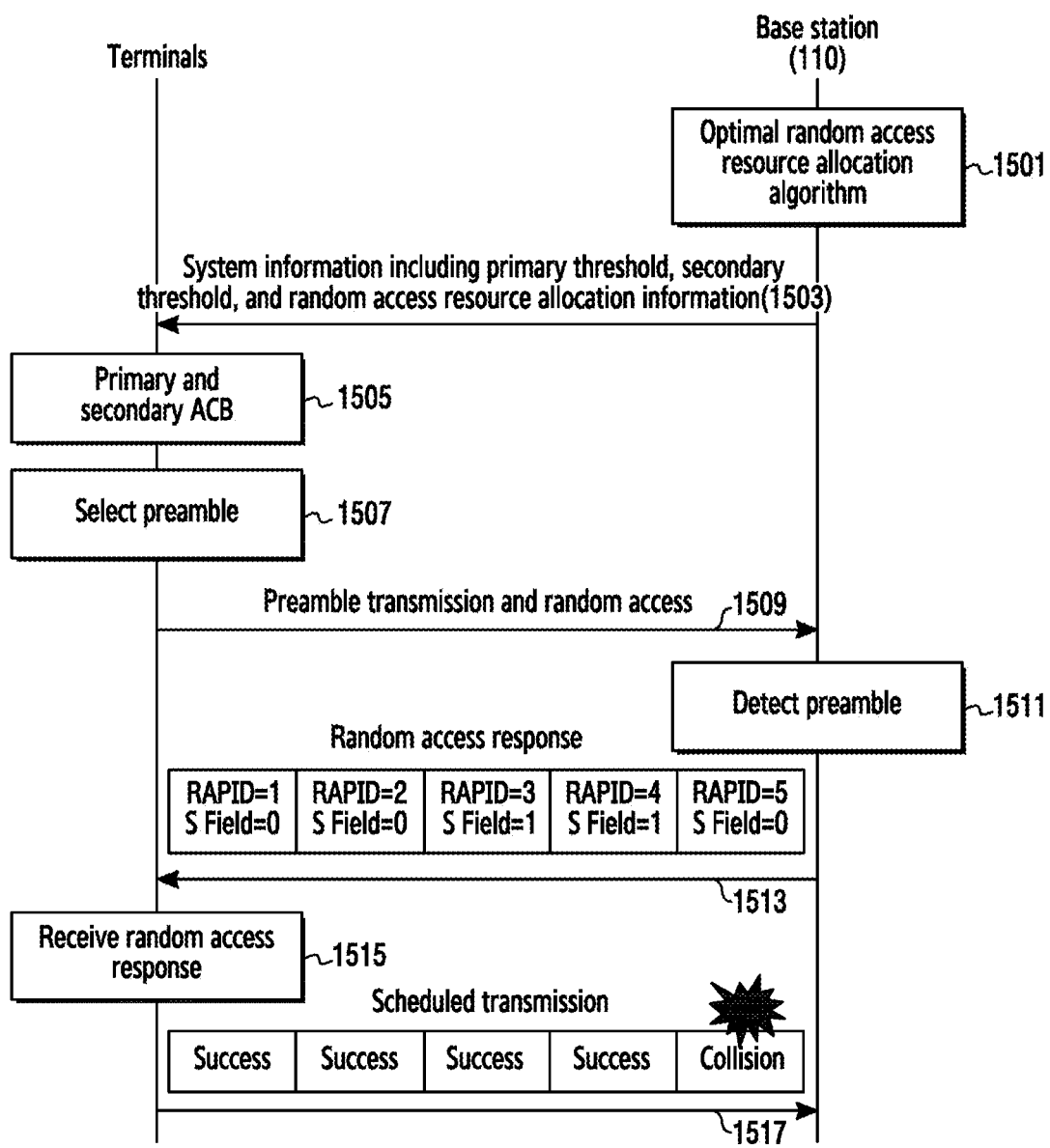
FIG. 15 illustrates a random access procedure in a wireless communication system according to an exemplary embodiment of the present invention.

FIG. 15 illustrates a random access procedure in a wireless communication system according to an exemplary embodiment of the present invention. An operation of terminals for performing random access by utilizing a plurality of thresholds and an operation of the base station 110 for controlling random access by utilizing the plurality of thresholds in the wireless communication system according to the exemplary embodiment of the present invention are exemplified in FIG. 15.

Referring to FIG. 15, in step 1501, the base station 110 determines a plurality of thresholds and random access resource allocation information by performing an optimal random access resource allocation algorithm. The optimal random access resource allocation algorithm is for maximizing efficiency of resource utilization in the wireless communication system. The terminal 110 determines a primary ACB probability, a secondary ACB probability, and the random access resource allocation information by estimating the number of terminals which have attempted random access in a previous frame. Hereinafter, for convenience of explanation, the primary ACB probability is designated as a primary threshold, and the secondary ACB probability is designated by a secondary threshold.

Proceeding to step 1503, the terminals receive system information including the primary threshold, the secondary threshold, and the random access resource allocation information from the base station 110. Information indicating the number of random access opportunities is determined by the product of the number of available PRACH subframes and the number of available preambles, and may be acquired through the random access resource allocation information.

The terminals determine respective arbitrary values q, and compare the arbitrary values q with the primary and secondary thresholds acquired from the received system information. Proceeding to step 1505, the terminals perform a primary ACB procedure and a secondary ACB procedure. Hereinafter, for convenience of explanation, a numerical value is taken for example. For example, it is assumed that the terminals 120-1, 120-2, 120-3, and 120-4 set the arbitrary values q respectively to 0.3, 0.2, 0.1, and 0.3, the terminals 140-1 and 140-2 set the arbitrary values q respectively to 0.5 and 0.7, each of the terminals 130-1 and 130-2 sets the arbitrary value to 0.9, and the primary threshold and the secondary threshold are respectively set to 0.4 and 0.8 by the base station 110.

In the primary ACB procedure, the terminals 120-1, 120-2, 120-3, 120-4, 130-1, 130-2, 140-1, and 140-2 compare the respectively determined arbitrary values q with the primary threshold. The terminals 120-1, 120-2, 120-3, and 120-4 having a smaller value than the primary threshold are determined as the primary random access terminals, and the remaining terminals 130-1, 130-2, 140-1, and 140-2 are excluded in the primary random access. Subsequently, in the secondary ACB procedure, the remaining terminals 130-1, 130-2, 140-1, and 140-2 compare the respectively determined arbitrary values q with the secondary threshold. The terminals 140-1 and 140-2 having a smaller arbitrary value q than the secondary threshold are determined as the secondary random access terminals. The remaining terminals 130-1 and 130-2 are determined as random access barred terminals and thus wait for a T-barring time.

Proceeding to step 1507, the primary random access terminals 120-1, 120-2, 120-3, and 120-4 and the secondary random access terminals 140-1 and 140-2 select respective preambles. In the selecting of the preamble, in order to transmit the preamble to the base station 110, the terminal 120-1 selects a preamble corresponding to an RAPID 1, the terminal 120-2 selects a preamble corresponding to an RAPID 2, the terminals 120-3 and 120-4 select a preamble corresponding to an RAPID 5, the terminal 140-1 selects a preamble corresponding to an RAPID 3, and the terminal 140-2 selects a preamble corresponding to an RAPID 4. For convenience of explanation, the RAPID is referred to as a preamble identifier.

Subsequently, proceeding to step 1509, preamble transmission and random access are performed. The primary random access terminals 120-1, 120-2, 120-3, and 120-4 attempt random access by transmitting a preamble, and the secondary random access terminals 140-1 and 140-2 attempt random access without preamble transmission. An operation of the secondary random access terminals 140-1 and 140-2 is also for attempting random access, and only difference is that a preamble is not transmitted.

Subsequently, proceeding to step 1511, the base station 110 detects the preamble from the terminals 120-1, 120-2, 120-3, 120-4, 140-1, and 140-2. Herein, the base station 110 confirms at least one detected preamble and at least one not-detected preamble. In the detecting of the preamble, the base station 110 may detect the preamble in case of the primary random access terminals 120-1, 120-2, 120-3, and 120-4, and may not detect the preamble in case of the secondary random access terminals 140-1 and 140-2. In other words, the base station 110 determines the detected preamble as a random access attempt by at least one primary random access terminal, and determines the not-detected preamble as a random access attempt by at least one secondary random access terminal. The base station 110 may determine which preamble is used to perform the random access attempt of the primary random access terminals 120-1, 120-2, 120-3, and 120-4, and which preamble is used to perform the random access attempt of the secondary random access terminals 140-1 and 140-2.

In addition, the base station 110 sets an S-field included in a random access response on the basis of a preamble detection result. In this case, the base station sets an S-field included in a response corresponding to a preamble determined as the random access attempt of the primary random access terminals 120-1, 120-2, 120-3, and 120-4 to 0, and sets an S-field included in a response corresponding to a preamble determined as the random access attempt of the secondary random access terminals 140-1 and 140-2.

Thereafter, proceeding to step 1513, the base station 110 transmits a random access response for each preamble. Herein, the random access response for each preamble includes a field indicating whether it is the response corresponding to the random access attempt of the primary random access terminal or a response corresponding to the random access attempt of the secondary random access terminal.

Subsequently, proceeding to step 1515, the terminals 120-1, 120-2, 120-3, 120-4, 140-1, and 140-2 receive the random access response from the base station. Herein, S-field information included in the random access response shows that the primary random access terminal 120-1 receives a random access response for which the S-field is set to 0 in a preamble identifier 1, the primary random access terminal 120-2 receives a random access response for which the S-field is set to 0 in a preamble identifier 2, and the primary random access terminals 120-3 and 120-4 also receive a random access response for which the S-field is set to 0 in a preamble identifier 5. Meanwhile, the secondary random access terminal 140-1 receives a random access response for which the S-field is set to 1 in a preamble identifier 3, and the secondary random access terminal 140-2 receives a random access response for which the S-field is set to 1 in a preamble identifier 4.

Subsequently, the terminals 120-1, 120-2, 120-3, 120-4, 140-1, and 140-2 perform transmission scheduled in step 1517 on the basis of the random access response. In this case, the terminals 120-1, 120-2, 140-1, and 140-2 which have selected respectively different preambles successfully transmit a message, on the basis of the scheduled transmission, and terminals which have selected the same preamble transmit the message simultaneously on the basis of the scheduled transmission, which leads to a collision. The collision indicates a failure in message transmission.

Consequently, the terminals 120-1, 120-2, 140-1, and 140-2 are successfully connected through random access, and the terminals 120-3 and 120-4 which have failed in message transmission due to a collision fail in the connection through random access.

Figure 16:
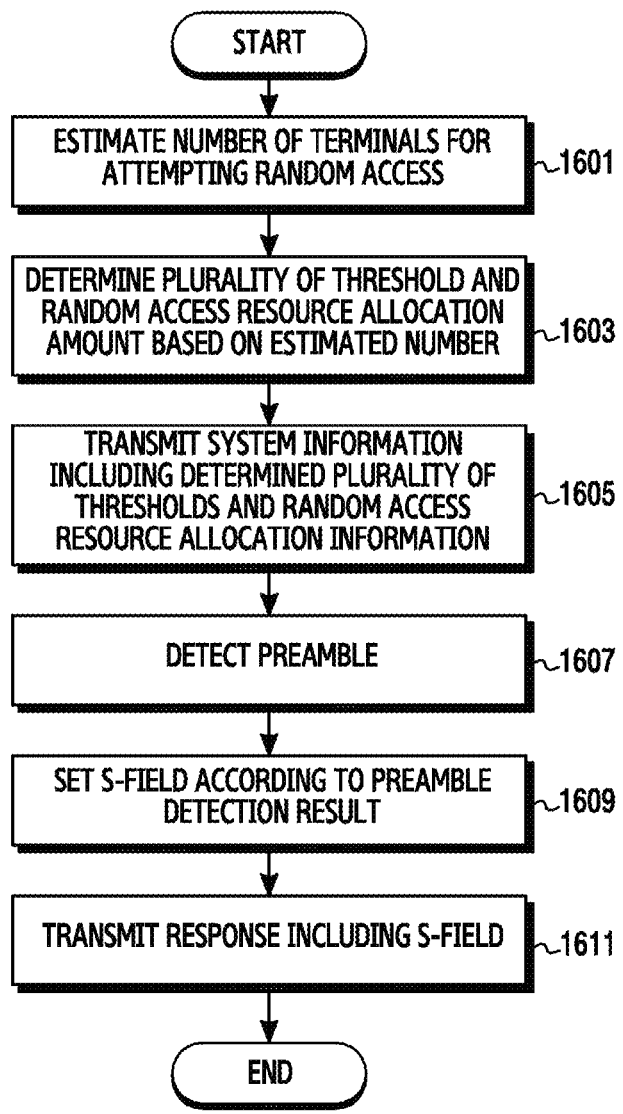
FIG. 16 illustrates a random access control procedure of a base station for utilizing a plurality of thresholds in a wireless communication system according to an exemplary embodiment of the present invention.

FIG. 16 illustrates a random access control procedure of a base station for utilizing a plurality of thresholds in a wireless communication system according to an exemplary embodiment of the present invention. An operational procedure of the base station for controlling random access is exemplified in FIG. 16.

Referring to FIG. 16, in step 1601, the base station estimates the number of terminals for attempting random access. The number of terminals is estimated by detecting a preamble from the terminals for attempting random access in a previous frame of a current frame in which the base station transmits system information.

Thereafter, proceeding to step 1603, the base station determines a plurality of thresholds on the basis of the estimated number of terminals. As a probability value for limiting the number of terminals for attempting random access, the plurality of thresholds determined by the base station may include a primary threshold for a primary access barring decision and a secondary threshold for a secondary access barring device. The primary threshold may be referred to as a primary ACB probability value, and the secondary threshold may be referred to as a secondary ACB probability value.

Thereafter, proceeding to step 1605, the base station transmits system information including the plurality of thresholds to the terminal. The system information includes information of a PRACH subframe, a preamble, or the like as a resource for performing random access. The PARCH subframe is a duration including a PRACH on which the terminal transmits a random access preamble through random access. The number of PRACH subframes in one frame is determined by the base station.

Proceeding to step 1607, the base station attempts preamble detection. In other words, the base station determines whether a preamble transmitted by at least one terminal is included in a signal received through the PRACH. For example, the base station may detect the preamble through a correlation operation for the received signal. Accordingly, the base station may confirm at least one detected preamble and at least one not-detected preamble.

Subsequently, proceeding to step 1609, the base station sets S-fields according to a preamble detection result. In the determining of whether the preamble is detected, the base station can detect a preamble transmitted from a terminal determined as a first mode, and cannot detect a preamble selected by a terminal determined as a second mode. Accordingly, the base station may estimate a preamble selected by terminals corresponding to the first mode and a preamble selected by terminals corresponding to the second mode. That is, the base station sets an S-field corresponding to a detected preamble as a negative value, and sets an S-field corresponding to a not-detected preamble as a positive value.

Thereafter, proceeding to step 1611, the base station transmits a random access response. In addition, the random access response may further include resource allocation information, TA information, or the like in addition al the S-field.

Figure 17:
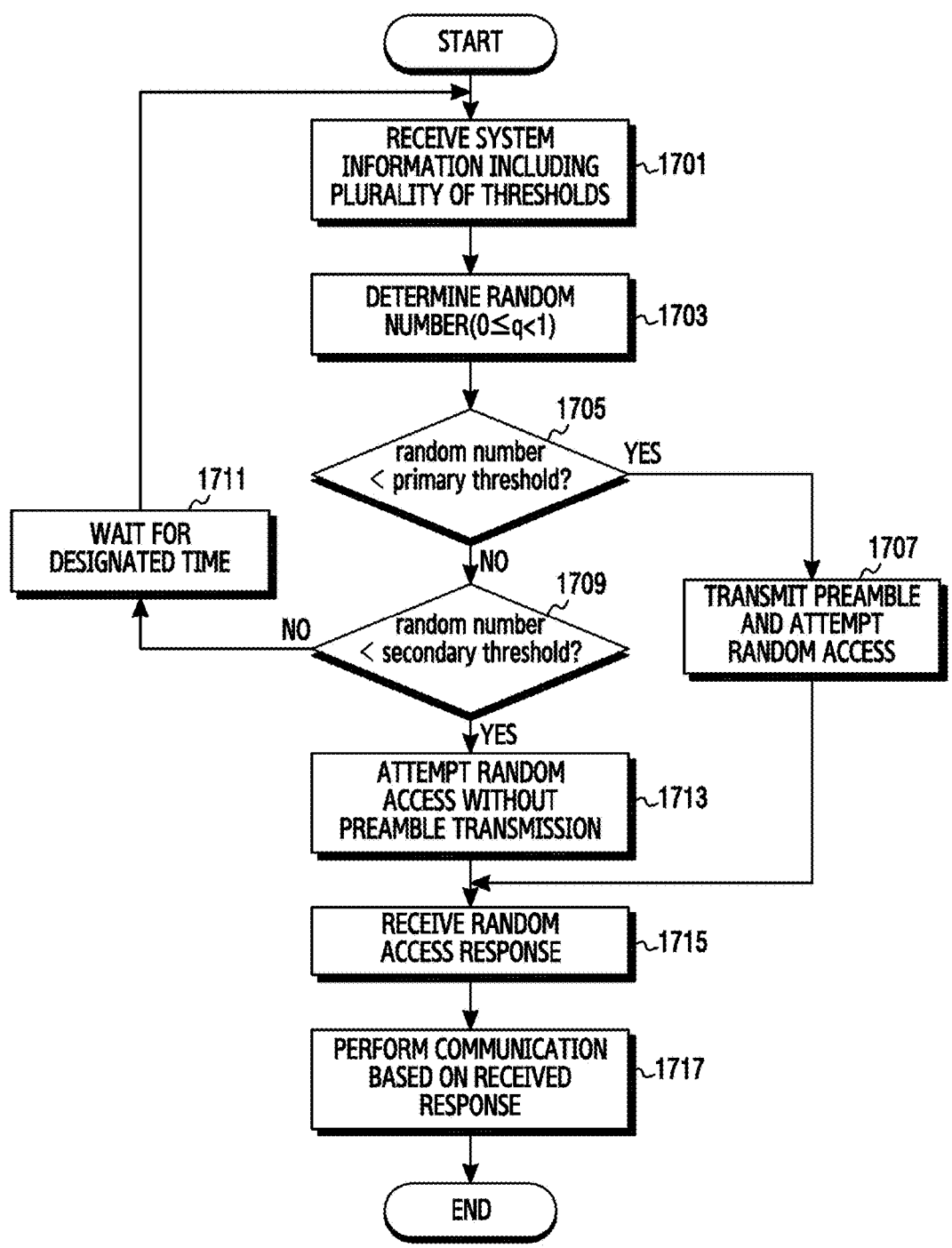
FIG. 17 illustrates a procedure of performing random access of a terminal for utilizing a plurality of thresholds in a wireless communication system according to an exemplary embodiment of the present invention.

FIG. 17 illustrates a procedure of performing random access of a terminal for utilizing a plurality of thresholds in a wireless communication system according to an exemplary embodiment of the present invention. A procedure of operating a terminal for performing random access is exemplified in FIG. 17.

Referring to FIG. 17, in step 1701, the terminal receives system information including a plurality of thresholds from a base station. The plurality of thresholds may include probability values for determining whether terminal access is barred such as a primary threshold for determining whether it is primary access barring, a secondary threshold for determining whether it is secondary access barring, or the like.

In step 1703, the terminal determines a random number. The random number is determined by the terminal in the range of 0 to 1. The random number is used as a reference value for determining whether access of the terminal is barred in order to be compared with the plurality of thresholds.

Subsequently, proceeding to step 1705, the terminal compares the generated random number with a primary threshold. If the random number is less than the primary threshold, the terminal is selected as the first mode, and proceeding to step 1701, attempts random access by transmitting a preamble.

If the random number is greater than or equal to the primary threshold, proceeding to step 1709, the terminal compares the random number with a secondary threshold. If the random number of the terminal is greater than or equal to the secondary threshold, the terminal is determined as a barred terminal. Proceeding to step 1711, the terminal waits for a designated time. After the designated time expires, returning to step 1701, the terminal attempts random access to the base station, and receives again system information from the base station. The designated time may be referred to as a T-barring time.

If the random number is less than the secondary threshold, the terminal is selected as the second mode, and proceeding to step 1713, attempts random access without preamble transmission. An operation of the terminal selected as the second mode is the same as an operation of the terminal selected as the first mode in that random access is attempted, and only difference is that a preamble is not transmitted.

In step 1715, the terminal receives a random access response from the base station. The random access response includes S-field information which is set to 1 or 0. Herein, the S-field information is set to 0 indicating negativity when the base station detects a preamble from the base station, and is set to 1 indicating positivity when the preamble is not detected.

Subsequently, proceeding to step 1717, communication is performed on the basis of a received response. Upon receiving a response including S-field information which is set to 0, the terminal selected as the first mode determines it as a random access response for a first mode terminal. Upon receiving a response including S-field information which is set to 1, the terminal selected as the second mode determines it as a random access response for a second mode terminal. That is, if a field included in a response corresponding to a selected preamble is set to a negative value, the terminal selected as the first mode performs scheduled transmission for an access procedure through a resource indicated by resource allocation information included in the response, and if the field included in the response corresponding to the selected preamble is set to a positive value, the terminal selected as the second mode performs the scheduled transmission for the access procedure through the resource indicated by the resource allocation information included in the response.

Figure 18:
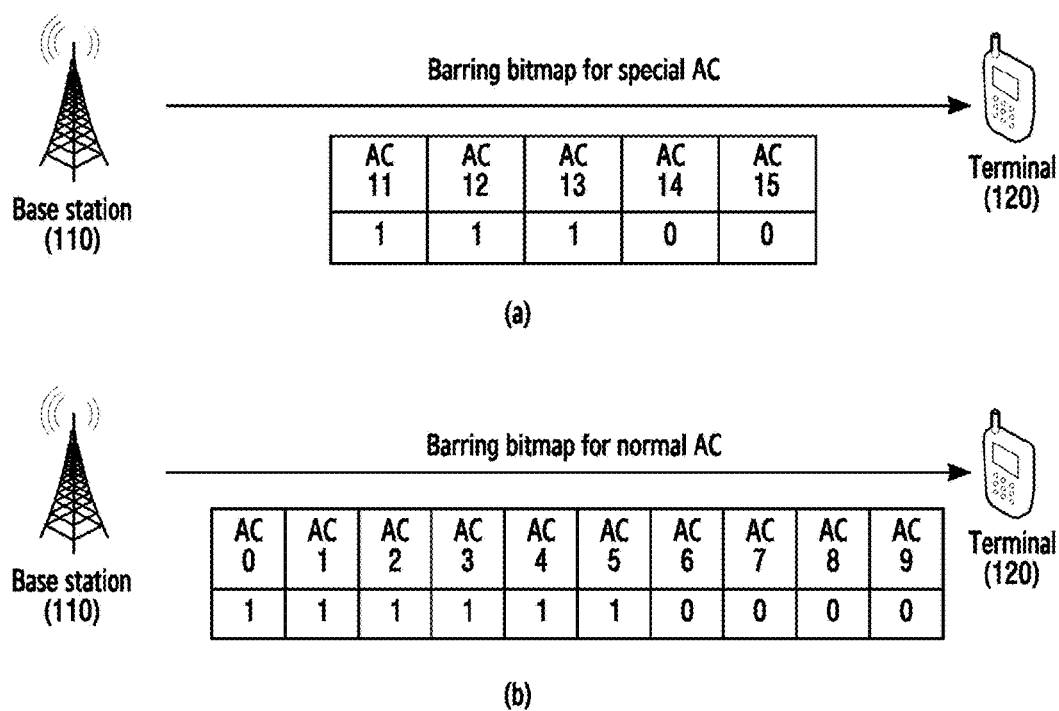
FIG. 18 illustrates an access barring bitmap according to a parameter configuration for applying Access Class Barring (ACB) for each access class in a wireless communication system.

FIG. 18 illustrates an access barring bitmap according to a parameter configuration for applying ACB for each access class in a wireless communication system. Bitmaps to which access barring for each access class is applied by configuring a parameter in system information is exemplified in FIG. 18.

FIG. 18A illustrates a bitmap for controlling whether access is allowed for each special Access Class (AC) in system information including PRACH subframe configuration information, preamble configuration information, access control information, and the like transmitted by the base station 110 to the terminal 120 through a System Information Block (SIB) 2. An AC 11 is used for a Public Land Mobile Network (PLMN) as a unique identification code of a mobile communication company. An AC 12 is used for a security service. An AC 13 is used for public utilities. An AC 14 is used for an emergency service. An AC 15 is used for PLMN steps. It is illustrated in FIG. 18A that limited access based on ACB is allowed in the AC 11, the AC 12, and the AC 13, and an access class is allowed in the AC 14 and the AC 15.

FIG. 18B illustrates a bitmap for controlling whether access is allowed for a normal access class in system information including access control information transmitted by the base station 110 to the terminal 120 through an SIB 14.

A normal terminal belongs to any one class from an AC 0 to an AC 9 which are normal access classes.

It is illustrated in FIG. 18B that access is barred from the AC 0 to the AC 5, and is allowed from the AC 6 to the AC 9.

Figure 19:
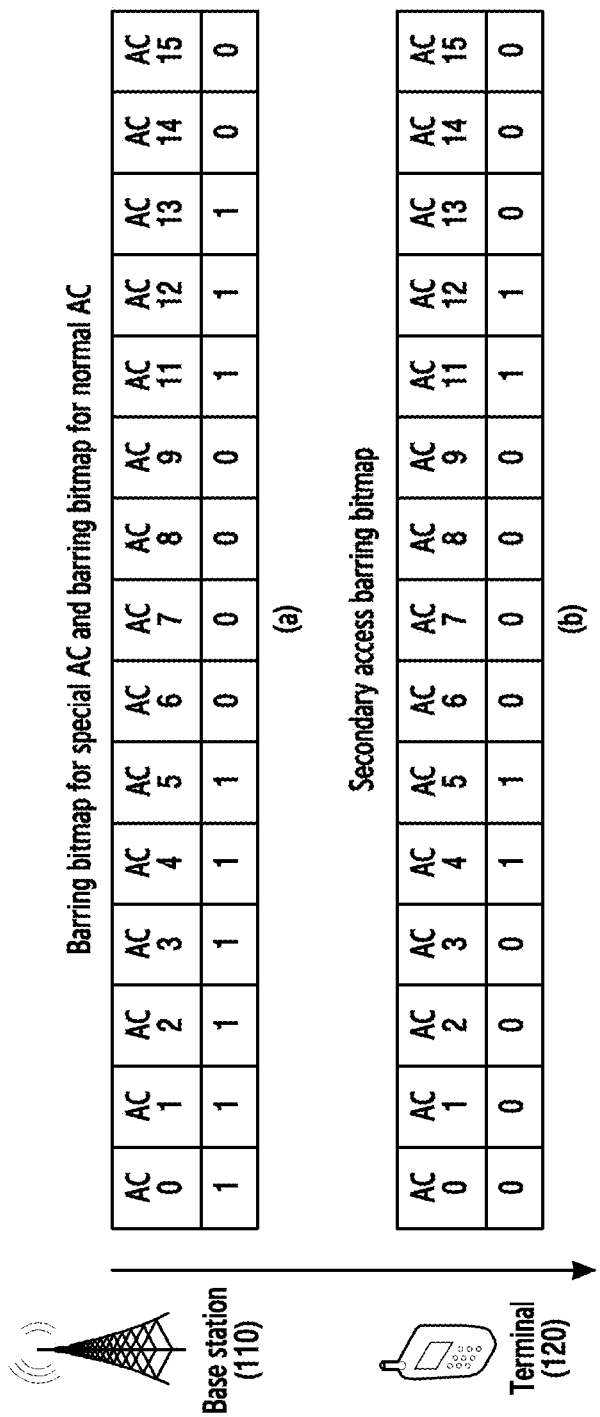
FIG. 19 illustrates an access barring bitmap depending on a parameter configuration for applying ACB for each Access Class (AC) in a wireless communication system according to another exemplary embodiment of the present invention.

FIG. 19 illustrates an access barring bitmap depending on a parameter configuration for applying ACB for each AC in a wireless communication system according to another exemplary embodiment of the present invention. It is illustrated an example of operating a bitmap for controlling whether secondary access is allowed for all ACs together with a barring bitmap for a special AC and a barring bitmap for a normal AC, when controlling access for each AC by configuring a parameter in system information. In FIG. 9A, the barring bitmap for the special AC and the barring bitmap for the normal AC are illustrated together in system information transmitted by the base station 110 to the terminal 120.

In an AC 0 to an AC 5, access of the terminal is barred. In an AC 6 to an AC 9, the access of the terminal is allowed. In an AC 11 to an AC 13, access based on ACB is allowed. In an AC 14 to an AC 15, the access is allowed.

FIG. 19B illustrates a secondary access barring bitmap in new system information transmitted by the base station 110 to the terminal 120. For example, in an AC 0 to an AC 3, an AC 6 to an AC 9, and an AC 13 to an AC 15 according to FIG. 19B, secondary access is barred. In an AC 4 to an AC 5 and an AC 11 to an AC 12, secondary access is allowed by secondary ACB. In the AC 4 to AC 5 of which access is barred in FIG. 19A, secondary access based on secondary ACB is allowed according to FIG. 19B. In an AC 11 to AC 12 of which access is allowed by ACB in FIG. 19A, secondary access based on secondary ACB is allowed according to FIG. 19B.

Figure 20:
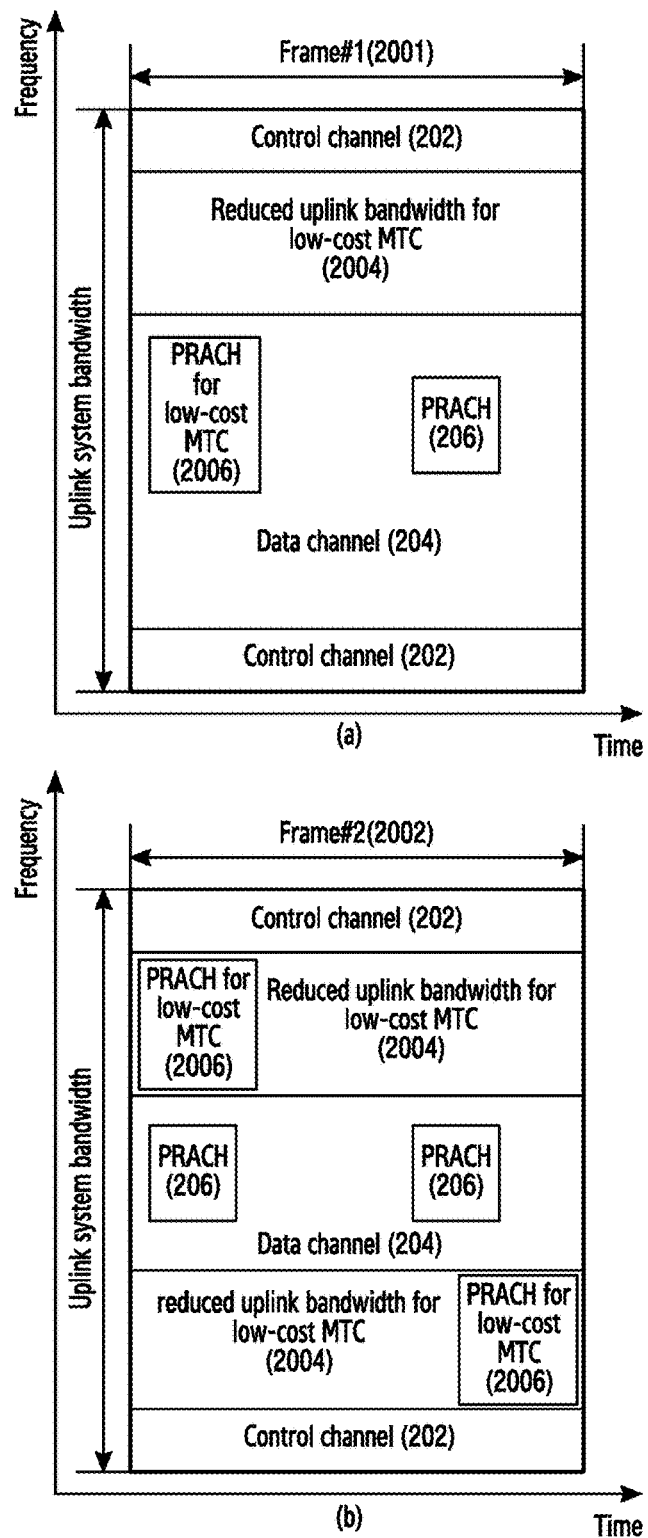
FIG. 20 illustrates two random access frames for random access of a low-cost Machine Type Communication (MTC) terminal in a wireless communication system.

FIG. 20 illustrates two random access frames for random access of a low-cost Machine Type Communication (MTC) terminal in a wireless communication system. It is exemplified in FIG. 20 that a decreased uplink bandwidth for the low-cost MTC terminal is included in a channel structure. It is exemplified in FIG. 20A that the number and location of PRACHs are not changed on the basis of a PRACH subframe configuration in a channel structure not considering the existing reduced uplink bandwidth. It is exemplified in FIG. 20B that the number of PRACH subframes is increased since a PRACH subframe for a low-cost MTC terminal is included in an uplink bandwidth frame reduced for a low-cost MTC. For example, the reduced uplink bandwidth may be referred to as an uplink 1.4 MHz narrowband. Hereinafter, for convenience of explanation, the PRACH subframe is referred to as a PRACH.

Referring to FIG. 20A, an uplink frame#1 2001 may include a control channel 202, a reduced uplink bandwidth 2004 for a low-cost MTC, and a data channel 204. Some resources in the data channel 204 may be allocated as a PRACH 206 for random access and a PRACH 2006 for the low-cost MTC.

A base station may allocate the PRACH 2006 for the low-cost MTC by defining new system information for a low-cost MTC terminal. The low-cost MTC terminal attempts the random access in the allocated PRACH 2006 for the low-cost MTC.

Referring to FIG. 20B, an uplink frame#2 2002 may include a control channel 202, a reduced uplink bandwidth 2004 for a low-cost MTC, and a data channel 204. Some resources in the data channel 204 may be allocated as a PRACH 206 for random access. The uplink bandwidth 2006 for the low-cost MTC terminal may include a PRACH 2006 for the low-cost MTC.

A base station defines new system information for the low-cost MTC terminal. Therefore, the low-cost MTC terminal may attempt the random access in the PRACH 2006 for the low-cost MTC in the reduced uplink bandwidth 2004 for a plurality of low-cost MTCs, and may receive a random access response in a reduced downlink bandwidth.

Figure 21:
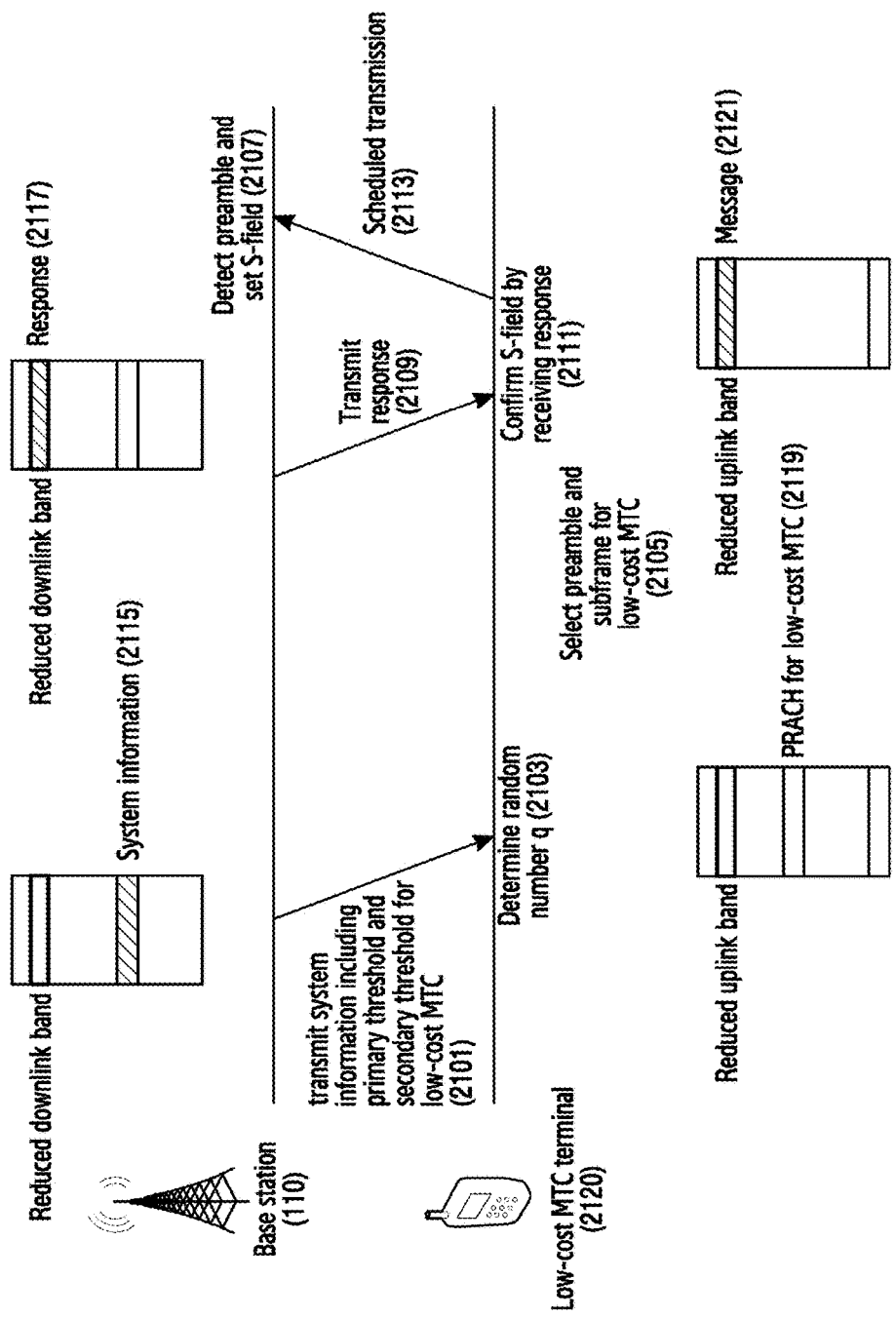
FIG. 21 illustrates a procedure of performing random access of a low-cost MTC terminal by utilizing a plurality of thresholds in a wireless communication system according to another exemplary embodiment of the present invention.

FIG. 21 illustrates a procedure of performing random access of a low-cost MTC terminal by utilizing a plurality of thresholds in a wireless communication system according to another exemplary embodiment of the present invention. A random access procedure in which a low-cost MTC terminal attempts random access in a PRACH of a reduced uplink bandwidth and receives a random access response in a reduced downlink bandwidth is exemplified in FIG. 21.

Referring to FIG. 21, in step 2101, the base station 110 transmits system information 2115 including primary and secondary thresholds for a low-cost MTC to an MTC terminal 2120 in a bandwidth other than the reduced downlink bandwidth. The primary and secondary thresholds are values determined by the base station to control the random access of the terminal.

The low-cost MTC terminal 2120 receives system information 2115 from the base station 110, and proceeding to step 2103, determines a random number q. Herein, it is assumed that the random number q is a value greater than a primary threshold and less than a secondary threshold.

Subsequently, the low-cost MTC terminal 2120 compares the random number q with the primary threshold acquired from the system information 2115, and the low-cost MTC terminal 2120 which has determined the random number q greater than the primary threshold is not determined as a primary random access terminal since the random number q is greater than the primary threshold. Subsequently, the low-cost MTC terminal 2120 compares the random number q with the secondary threshold. The low-cost MTC terminal 2120 determines the random number q less than the secondary threshold, and thus is determined as a secondary random access terminal.

Proceeding to step 2105, the low-cost MTC terminal determined as the secondary random access terminal selects a PRACH 2119 for the low-cost MTC, and attempts the random access by not transmitting a preamble for the low-cost MTC. The not-transmitting of the preamble for the low-cost MTC implies that the low-cost MTC terminal 2120 does not transmit the preamble for the low-cost MTC, and attempts the random access to the base station 110.

Subsequently, processing to step 2107, the base station 110 attempts preamble detection. In other words, the base station 110 determines whether a preamble transmitted by at least one terminal is included in a signal received through the PRACH 2119. For example, the base station 110 may detect the preamble through a correlation operation for the received signal. Accordingly, the base station may confirm at least one detected preamble or at least one not-detected preamble. Subsequently, the base station 110 sets S-fields according to a preamble detection result. In the determining of whether the preamble is detected, the base station 110 can detect a preamble transmitted from a random access terminal, and cannot detect a preamble selected form the secondary random access terminal. Accordingly, the base station may estimate a preamble identifier selected by the primary random access terminal and a preamble identifier selected by the secondary random access terminal. That is, the base station sets an S-field corresponding to a detected preamble as a negative value, and sets an S-field corresponding to a not-detected preamble as a positive value.

Proceeding to step 2109, the base station 110 transmits a response 2117 including the 5-field to terminals in a reduced downlink bandwidth. Subsequently, proceeding to step 2111, the secondary random access terminal receives the response 2117 from a corresponding preamble identifier, and confirms the S-field. If information indicated by the S-field is 0, it indicates that the response is a random access response for the primary random access terminal, and if the information indicated by the S-field is 1, it indicates that the response is a random access response for the secondary random access terminal.

Herein, if the S-field is set to 1 indicating positivity, proceeding to step 2113, the secondary random access terminal performs scheduled transmission. The performing of the scheduled transmission implies that scheduled transmission for an access procedure is performed on the base station 110 through a resource indicated by resource allocation information included in the response 2117, and implies that a message 2121 is transmitted to the base station 110 through a resource indicated by the resource allocation information.

Figure 22:
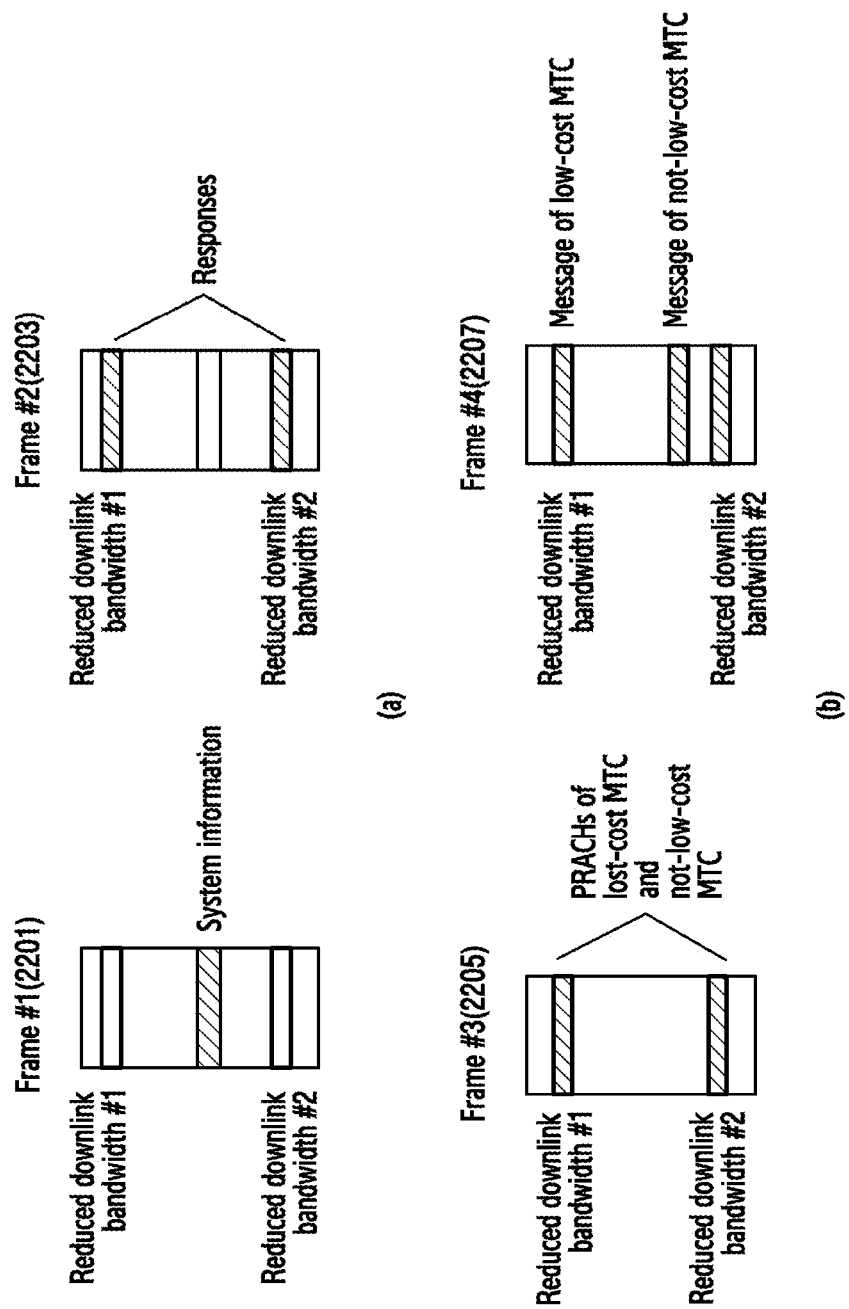
FIG. 22 illustrates frames for random access of two types of different terminals according to an exemplary embodiment of the present invention.

FIG. 22 illustrates frames for random access of two types of different terminals according to an exemplary embodiment of the present invention. A frame structure is exemplified in FIG. 22 in a case where random access is also allowed to a low-cost MTC terminal in a reduced band for a low-cost MTC. Hereinafter, for convenience of explanation, a low-cost terminal is referred to as a normal terminal.

Referring to FIG. 22A, a frame#1 2201 includes a reduced downlink bandwidth. System information may be transmitted in a bandwidth other than the reduced downlink bandwidth. System information includes random access resource information, a primary random access probability, and secondary random access probability. A frame#2 2203 indicates a location of responses transmitted by terminals on the basis of a preamble detection result after the base station detects a preamble from a low-cost MTC terminal and normal terminals. That is, the base station transmits the responses to the low-cost MTC terminal and the normal terminal in the reduced downlink bandwidth. The responses include S-field information, and are set to a value indicating negativity (e.g., 0) upon detecting the preamble, and are set to a value indicating positivity (e.g., 1).

Referring to FIG. 22B, a frame#3 2205 includes a reduced uplink bandwidth#1 and a reduced uplink bandwidth#2. Herein, the reduced uplink bandwidths may include a PRACH of the low-cost MTC terminal and a PRACH for attempting random access of the normal terminal. The low-cost MTC terminal and the normal terminal attempt the random access to the base station in the reduced uplink bandwidth#1 and the reduced uplink bandwidth#2. A frame#4 2207 indicates that the low-cost MTC terminal can transmit a message of the low-cost MTC terminal through the reduced uplink bandwidth#1 or the reduced uplink bandwidth#2 on the basis of a response received from the base station, and the normal terminal can transmit a message of the normal message in a bandwidth other than the reduced uplink bandwidth on the basis of the response received from the base station.

Figure 23:
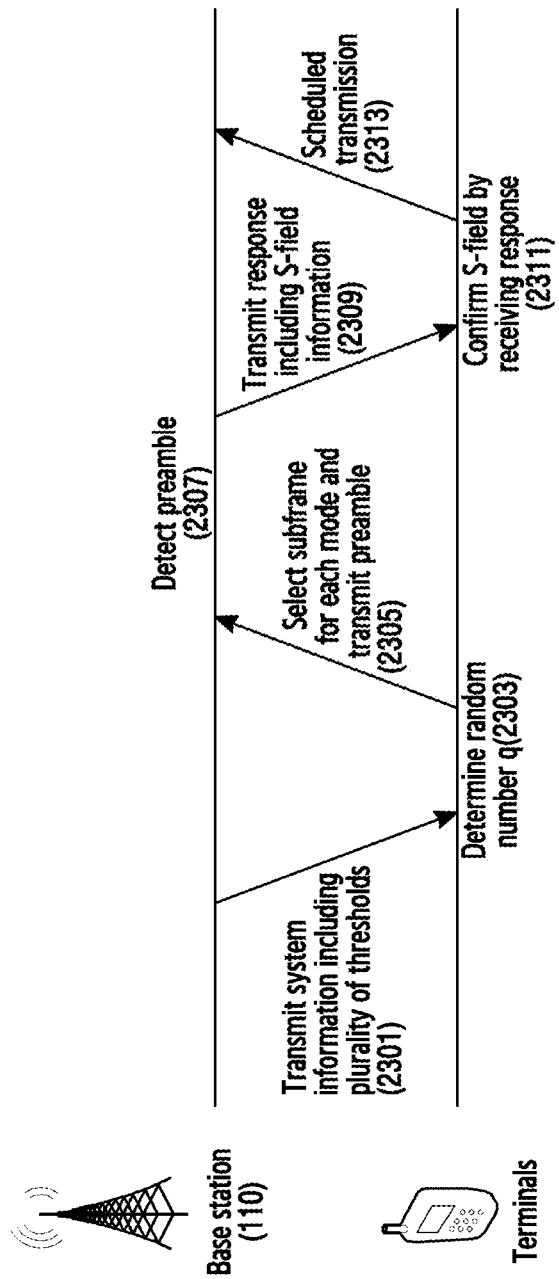
FIG. 23 illustrates a procedure of performing random access of two types of terminals by utilizing a plurality of thresholds in a wireless communication system according to an exemplary embodiment of the present invention.

FIG. 23 illustrates a procedure of performing random access of two types of terminals by utilizing a plurality of thresholds in a wireless communication system according to an exemplary embodiment of the present invention. Random accesses of low-cost MTC terminals and not-low-cost MTC terminals are exemplified in FIG. 23.

Referring to FIG. 23, in step 2301, the base station 110 transmits new system information including a plurality of thresholds in a frame#1 2201. A primary threshold and a secondary threshold refer to a value determined by the base station 110 to control the random access of the terminal, and terminals refer to low-cost MTC terminals and not-low-cost MTC terminals which are not the low-cost MTC terminals. The new system information may include primary and secondary thresholds for the low-cost MTC terminal and primary and secondary thresholds for the not-low-cost MTC terminal.

The terminals receive system information from the base station 110, and proceeding to step 2303, determine a random number q. Subsequently, the terminals compare the random number q with the primary threshold acquired from the system information, and determine terminals which have determined the random number q less than the primary threshold as a first mode and determine terminals which have determined the random number q greater than or equal to the primary threshold and less than the secondary threshold as a second mode. In this case, it is assumed that the primary threshold for the low-cost MTC terminal is greater than 0, and the secondary threshold for the low-cost MTC terminal is 0. In addition, it is assumed that the primary threshold for the not-low-cost terminal is 0, and the secondary threshold for the not-low-cost MTC terminal is greater than 0. That is, the low-cost MTC terminals are determined as the first mode, and the not-low-cost MTC terminals are determined as the second mode. Hereinafter, for convenience of explanation, the terminals determined as the first mode are referred to as primary random access terminals, and the terminals determined as the second mode are referred to as secondary random access terminals.

Proceeding to step 2305, the primary random access terminals and the secondary random access terminals select a subframe in the reduced uplink bandwidth#1 and reduced uplink bandwidth#2 of the frame#3 2205 on the basis of each determined mode, and transmit or do not transmit the preamble. Herein, the primary random access terminals select a PRACH and attempt random access by transmitting the preamble, and the secondary random access terminals select the PRACH and attempt the random access by not transmitting the preamble. The PRACH selected by the secondary random access is based on system information newly defined by the base station 110, and may be a PRACH for the low-cost MTC terminal in the reduced uplink bandwidth frame.

Subsequently, proceeding to step 2307, the base station 110 attempts preamble detection. In other words, the base station 110 determines whether a preamble transmitted by at least one terminal is included in a signal received through the PRACH. For example, the base station 110 may detect the preamble through a correlation operation for the received signal. Accordingly, the base station 110 may confirm at least one detected preamble and at least one not-detected preamble. Subsequently, the base station 110 sets S-fields according to a preamble detection result. In the determining of whether the preamble is detected, the base station 110 can detect a preamble transmitted from a random access terminal, and cannot detect a preamble selected form the secondary random access terminal. Accordingly, the base station 110 may estimate a preamble selected by the primary random access terminal and a preamble selected by the secondary random access terminal. That is, the base station sets an S-field corresponding to a detected preamble as a negative value, and sets an S-field corresponding to a not-detected preamble as a positive value.

Proceeding to step 2309, the base station 110 transmits a message including a response to the terminals in the reduced downlink bandwiths#1 and #2 of the frame#2 2203. Herein, the response includes an S-field indicating whether it is a response corresponding to a random access attempt of the primary random access terminal or a response corresponding to a random access attempt of the secondary random access terminal. In addition, a resource for scheduled transmission in the reduced uplink bandwidth is allocated to the primary random access terminal, and a resource for scheduled transmission in a bandwidth other than the reduced uplink bandwidth is allocated to the secondary random access terminal.

Subsequently, proceeding to step 2311, the primary random access terminals and the secondary random access terminals receive a response transmitted in the frame#2 2203, and confirm the S-field. If the S-field is set to 0 indicating negativity, it is determined as a random access response for the primary random access terminals, and if the S-field is set to 1 indicating positivity, it is determined as a random access response for the secondary random access terminals. Subsequently, proceeding to step 2313, the primary and secondary random access terminals transmit a message of the primary random access terminals through the reduced uplink bandwidth of the frame#4 2207 if the S-field is 0, and transmit a message of secondary random access terminals through a bandwidth other than the reduced uplink bandwidth of the frame#4 2207 if the S-field is set to 1 indicating positivity. That is, in case of the primary random access terminal, if the S-field included in a response corresponding to the selected preamble is set to a negative value, scheduled transmission for an access procedure is performed through a resource indicated by resource allocation information included in the response. In addition, in case of the secondary random access terminal, if the S-field included in the response corresponding to the selected preamble is set to a positive value, scheduled transmission for an access procedure is performed through a resource indicated by resource allocation information included in the response.

Figure 24:
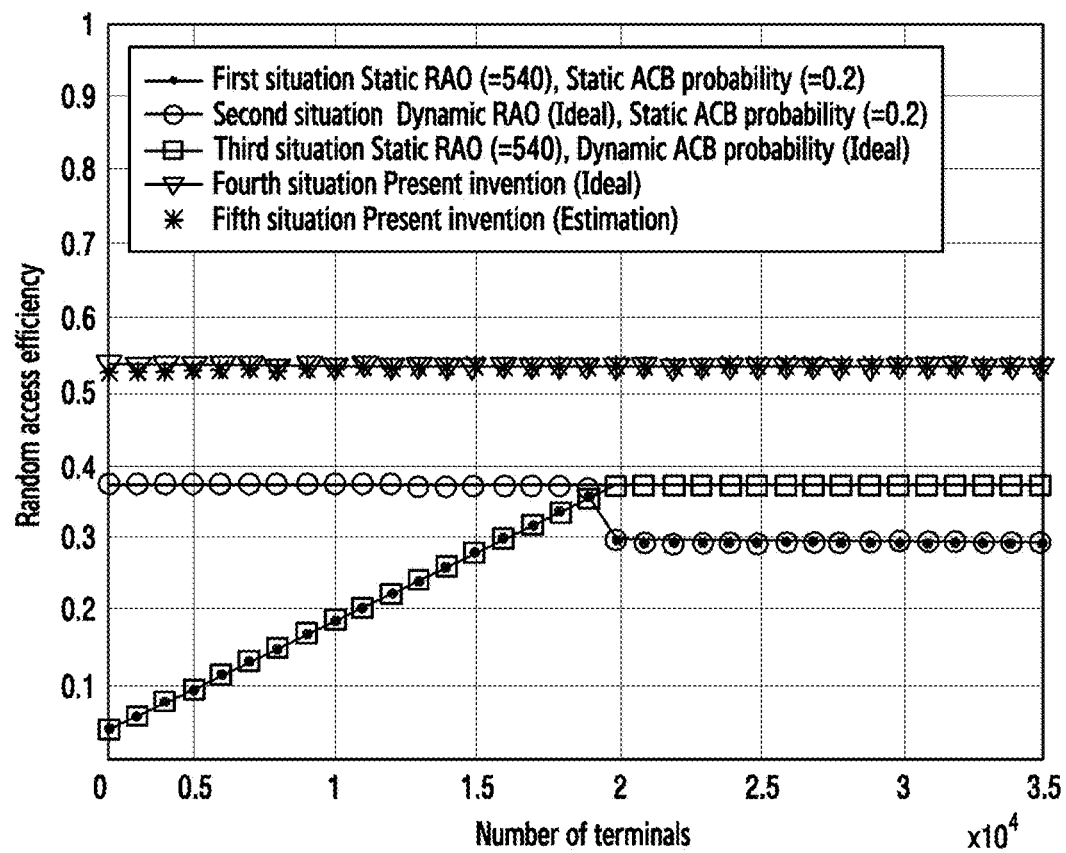
FIG. 24 and FIG. 25 illustrate a simulation result of a wireless communication system according to an exemplary embodiment of the present invention.
Figure 25:
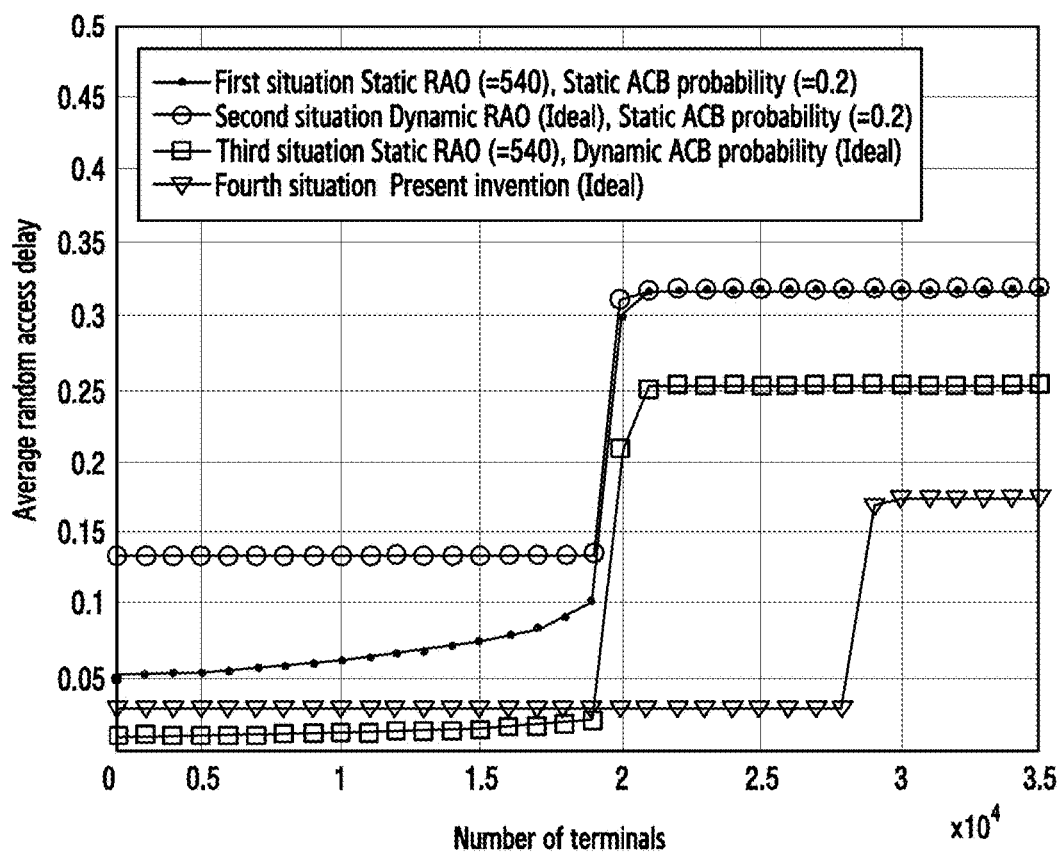

FIG. 24 and FIG. 25 illustrate a simulation result of a wireless communication system according to an exemplary embodiment of the present invention. An optimization scheme in a MATLAB for utilizing a steepest decent method is utilized in the simulation. The simulation is performed in a frame unit of 10 ms, and the maximum number of MTC terminals which may exist in a cell is 5000. Referring to FIG. 24 and FIG. 25, a first situation is a case where a static random access opportunity is 540, and a static ACB probability is 0.2. A second situation is a case where a dynamic random access opportunity is ideal, and a static ACB probability is 0.2. A third situation is a case where a static random access opportunity is 540, and a dynamic ACB probability is ideal. A fourth situation is a case where an ideal random access opportunity proposed in the present invention and ACB probabilities are configured respectively. A fifth situation is a case where a random access opportunity based on Equation (1) for the proposed estimation and ACB probabilities are configured. Herein, the ideal refers to a case of utilizing the number of estimated terminals corresponding to the actual number of terminals, the estimation refers to a case of utilizing the number of terminals estimated on the basis of Equation (1) of the present invention, and the static random access opportunity refers to a value designated to 54 which is the number of preambles per 10 subframes. In addition, the first, second, and third situations are configured according to the conventional ACB technique.

Referring to FIG. 24, a vertical axis represents random access efficiency, and a horizontal axis represents the number of terminals. Herein, the number of terminals indicates the number of terminals for newly attempting random access. The number of contending terminals in a first frame is 0, and a case where a difference between the number of average contention terminals of a previous frame and the number of average contention terminals of a current frame is less than 0.001 is defined as a normal state. In addition, an arrival rate of the number of terminals for newly attempting random access indicates a range of 20000 and 35000. It is increased at a level of 200 or 300 per frame, and this is for average performance estimation of 100 frames in the normal state.

As shown in FIG. 24, fourth and fifth situations according to the exemplary embodiment of the present invention have efficiency improved by about 40% in comparison with the first, second, and third situations. Herein, random access efficiency is increased in an inverse proportion to the number of access barred terminals.

Referring to FIG. 25, a vertical axis denotes an average random access delay, and a horizontal axis denotes the number of terminals. Herein, the average random access delay denotes a time required when access barred terminals are successfully connected through a random access, and the number of terminals denotes the number of terminals for newly attempting the random access.

As shown in FIG. 25, the fourth situation according to the exemplary embodiment of the present invention shows about 10 times of a decrease from a time at which the number of contending terminals exceeds a resource acceptance limit in comparison with the first, second, and third situations. This shows that the number of terminals for re-attempting the random access is decreased since efficiency of utilizing a random access resource is more improved in the fourth situation than the first, second, and third situations, and thus a time required for successful access through the random access is decreased by up to 10 times.

Methods based on the embodiments disclosed in the claims and/or specification of the present invention can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present invention.

While the present invention has been shown and described with reference to certain preferred embodiments thereof, it will be understood by those skilled in the art that various changes in form and details may be made therein without departing from the spirit and scope of the present invention as defined by the appended claims. Therefore, the scope of the present invention is defined not by the detailed description thereof but by the appended claims, and all differences within equivalents of the scope will be construed as being included in the present invention.

What is claimed is:

1. A base station in a wireless communication system, the base station comprising:
   a transceiver; and
   at least one processor operably coupled to the transceiver, and configured to:
      transmit system information comprising:
         a primary threshold value for determining whether to perform an access attempt with a preamble transmission; and
         a secondary threshold value for determining whether to perform an access attempt without a preamble transmission, wherein the secondary threshold value is greater than the primary threshold value;
      determine a value according to whether a preamble is detected or not, and
      transmit a response comprising the value,
   wherein the value indicates whether the response is a response of a detected preamble or a response of a non-detected preamble,
   wherein the preamble is detected to perform the access attempt with the preamble transmission if an arbitrary value is smaller than the primary threshold value,
   wherein the preamble is not detected to perform the access attempt without the preamble transmission if the arbitrary value is greater than or equal to the primary threshold value and if the arbitrary value is smaller than the secondary threshold value, and
   wherein the access attempt without the preamble transmission corresponds to a second mode in which a random access is attempted by not transmitting the preamble.

2. The base station of claim 1, wherein the at least one processor is further configured to determine a plurality of threshold values including the primary threshold value and the secondary threshold value based on an estimation value for a number of terminals which attempt the random access.

3. The base station of claim 1,
   wherein the access attempt with the preamble transmission corresponds a first mode in which the random access is attempted by transmitting the preamble.

4. The base station of claim 3, wherein a plurality of threshold values comprises values for selecting one of the first mode and the second mode by a terminal.

5. The base station of claim 3,
wherein the value indicates whether the response is a response corresponding to random access attempt of the first mode or a response corresponding to random access attempt of the second mode.

6. The base station of claim 5, wherein the at least one processor is configured to set the value corresponding to the detected preamble to a negative value and set the value included in a response corresponding to the non-detected preamble to a positive value.

7. A terminal in a wireless communication system, the terminal comprising:
a transceiver; and
at least one processor operably coupled to the transceiver, and configured to:
receive, from a base station, system information comprising:
a primary threshold value for determining whether to perform an access attempt with a preamble transmission, wherein the access attempt with the preamble transmission corresponds to a first mode in which a random access is attempted by transmitting a preamble; and
a secondary threshold value for determining whether to perform an access attempt without a preamble transmission, wherein the secondary threshold value is greater than the primary threshold value, wherein the access attempt without the preamble transmission corresponds to a second mode in which the random access is attempted by not transmitting the preamble;
generate an arbitrary value;
identify the first mode if the arbitrary value is less than a primary threshold value;
identify the second mode if the arbitrary value is greater than or equal to the primary threshold value and smaller than the secondary threshold value;
perform an access attempt based on one of the identified first mode and the identified second mode, and
receive, from the base station, a response comprising a value indicating whether the response is a response of a detected preamble or a response of a non-detected preamble,
wherein the value is determined according to whether a preamble of the terminal is detected or not, and
wherein the at least one processor is further configured to control to attempt the random access by not transmitting the preamble if the second mode is identified.

8. The terminal of claim 7, wherein a plurality of threshold values comprises values for selecting one of the first mode and the second mode by the terminal.

9. The terminal of claim 7, wherein the at least one processor is further configured to control to attempt the random access by transmitting the preamble if the first mode is identified, and to attempt the random access by not transmitting the preamble if the second mode is identified.

10. The terminal of claim 7,
wherein the value indicates whether the response is a response corresponding to random access attempt of the first mode or a response corresponding to random access attempt of the second mode.

11. The terminal of claim 7,
wherein upon identifying the first mode, if a field comprised in a response corresponding to a selected preamble is set to a negative value, the at least one processor is configured to transmit a signal for an access procedure through a resource indicated by resource allocation information comprised in the response, and
wherein upon identifying the second mode, if the field comprised in the response corresponding to the selected preamble is set to a positive value, the at least one processor is configured to transmit a signal for an access procedure through a resource indicated by resource allocation information included in the response.

12. A method for operating a base station in a wireless communication system, the base station comprising:
transmitting system information comprising:
primary threshold value for determining whether to perform an access attempt with a preamble transmission; and
a secondary threshold value for determining whether to perform an access attempt without a preamble transmission, wherein the secondary threshold value is greater than the primary threshold value;
determining a value according to whether a preamble is detected or not; and
transmitting a response comprising the value,
wherein the value indicates whether the response is a response of a detected preamble or a response of a non-detected preamble,
wherein the preamble is detected to perform the access attempt with the preamble transmission if an arbitrary value is smaller than the primary threshold value,
wherein the preamble is not detected to perform the access attempt without the preamble transmission if the arbitrary value is greater than or equal to the primary threshold value and if the arbitrary value is smaller than the secondary threshold value, and
wherein the access attempt without the preamble transmission corresponds to a second mode in which a random access is attempted by not transmitting the preamble.

13. The method of claim 12, further comprising:
determining a plurality of threshold values including the primary threshold value and the secondary threshold value based on an estimation value for a number of terminals which attempt the random access.

14. The method of claim 12,
wherein the access attempt with the preamble transmission corresponds a first mode in which the random access is attempted by transmitting the preamble.

15. A method for operating a terminal in a wireless communication system, the method comprising:
receiving, from a base station, system information comprising:
a primary threshold value for determining whether to perform an access attempt with a preamble transmission wherein the access attempt with the preamble transmission corresponds to a first mode in which random access is attempted by transmitting a preamble, and
a secondary threshold value for determining whether to perform an access attempt without a preamble transmission, wherein the secondary threshold value is greater than the primary threshold value, wherein the access attempt without the preamble transmission corresponds to a second mode in which the random access is attempted by not transmitting the preamble;
generating an arbitrary value;
identifying the first mode if the arbitrary value is less than the primary threshold value;

identifying the second mode if the arbitrary value is greater than or equal to the primary threshold value and smaller than the secondary threshold value;

performing an access attempt based on one of the identified first mode and the identified second mode; and receiving, from the base station, a response comprising a value indicating whether the response is a response of a detected preamble or a response of a non-detected preamble, wherein the value is determined according to whether a preamble of the terminal is detected or not, and wherein the terminal is further configured to control to attempt the random access by not transmitting the preamble if the second mode is identified.

16. The method of claim 15, wherein the value indicates whether the response is a response corresponding to random access attempt of the first mode or a response corresponding to random access attempt of the second mode.

* * * * *